United States Patent
Zhang et al.

(10) Patent No.: US 10,031,847 B2
(45) Date of Patent: Jul. 24, 2018

(54) SYSTEM AND METHOD FOR REPLACEMENT IN ASSOCIATIVE MEMORIES USING WEIGHTED PLRU TREES

(71) Applicant: Intel Corporation, Santa Clara, CA (US)

(72) Inventors: Chunhui Zhang, Hillsboro, OR (US); Robert S. Chappell, Portland, OR (US); Yury N. Ilin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 15/282,901

(22) Filed: Sep. 30, 2016

(65) Prior Publication Data

US 2018/0095875 A1    Apr. 5, 2018

(51) Int. Cl.
| G06F 12/08 | (2016.01) |
| G06F 12/06 | (2006.01) |
| G06F 12/02 | (2006.01) |
| G06N 7/00 | (2006.01) |

(52) U.S. Cl.
CPC ........ G06F 12/0646 (2013.01); G06F 12/023 (2013.01); G06N 7/005 (2013.01); G06F 2212/69 (2013.01)

(58) Field of Classification Search
CPC .... G06F 12/0646; G06F 12/023; G06N 7/005
USPC .................................................. 711/128, 159
See application file for complete search history.

(56) References Cited

U.S. PATENT DOCUMENTS

| 9,170,955 | B2 * | 10/2015 | Forsyth ................. G06F 12/123 |
| 9,176,880 | B2 * | 11/2015 | Lee ...................... G06F 12/0864 |
| 9,348,766 | B2 * | 5/2016 | Basel .................... G06F 12/122 |
| 9,727,489 | B1 * | 8/2017 | Drerup ................. G06F 12/128 |
| 9,753,862 | B1 * | 9/2017 | Drerup ................. G06F 12/122 |
| 2009/0006755 | A1 * | 1/2009 | Illikkal ............... G06F 11/3409 |
| | | | 711/126 |
| 2009/0113132 | A1 * | 4/2009 | Cain .................... G06F 12/127 |
| | | | 711/133 |

(Continued)

OTHER PUBLICATIONS

Intel Corporation, "IA-32 Intel® Architecture Software Developer's Manual—vol. 2: Instruction Set Reference", 978 pages, 2003.

*Primary Examiner* — Pierre Miche Bataille
(74) *Attorney, Agent, or Firm* — Alliance IP, LLC

(57) ABSTRACT

A processor includes an associative memory including ways organized in an asymmetric tree structure, a replacement control unit including a decision node indicator whose value determines the side of the tree structure to which a next memory element replacement operation is directed, and circuitry to cause, responsive to a miss in the associative memory while the decision node indicator points to the minority side of the tree structure, the decision node indicator to point a majority side of the tree structure, and to determine, responsive to a miss while the decision node indicator points to the majority side of the tree structure, whether or not to cause the decision node indicator to point to the minority side of the tree structure, the determination being dependent on a current replacement weight value. The replacement weight value may be counter-based or a probabilistic weight value.

20 Claims, 34 Drawing Sheets

(56) References Cited

U.S. PATENT DOCUMENTS

2014/0215161 A1 7/2014 Basel et al.
2016/0070651 A1* 3/2016 Shwartsman ....... G06F 12/0897
                                                711/122

* cited by examiner

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

PACKED HALF
341

| 127 | 96 95 | 64 63 | 32 31 | 0 |
|---|---|---|---|---|
| SINGLE 3 | SINGLE 2 | SINGLE 1 | SINGLE 0 | |

PACKED SINGLE
342

| 127 | 64 63 | 0 |
|---|---|---|
| DOUBLE 1 | DOUBLE 0 | |

PACKED DOUBLE
343

FIG. 3B

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

| 127 | 112 111 | | | | 16 15 | 0 |
|---|---|---|---|---|---|---|
| wwww wwww wwww wwww | • | • | • | wwww wwww wwww wwww |

UNSIGNED PACKED WORD REPRESENTATION 346

| 127 | 112 111 | | | | 16 15 | 0 |
|---|---|---|---|---|---|---|
| swww wwww wwww wwww | • | • | • | swww wwww wwww wwww |

SIGNED PACKED WORD REPRESENTATION 347

| 127 | | 92 91 | 32 31 | 0 |
|---|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | | 92 91 | 32 31 | 0 |
|---|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

SYSTEM AND METHOD FOR REPLACEMENT IN ASSOCIATIVE MEMORIES USING WEIGHTED PLRU TREES

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Each processor may include a cache or multiple caches, some of which may be set associative caches. Processors may be implemented in a system on chip.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
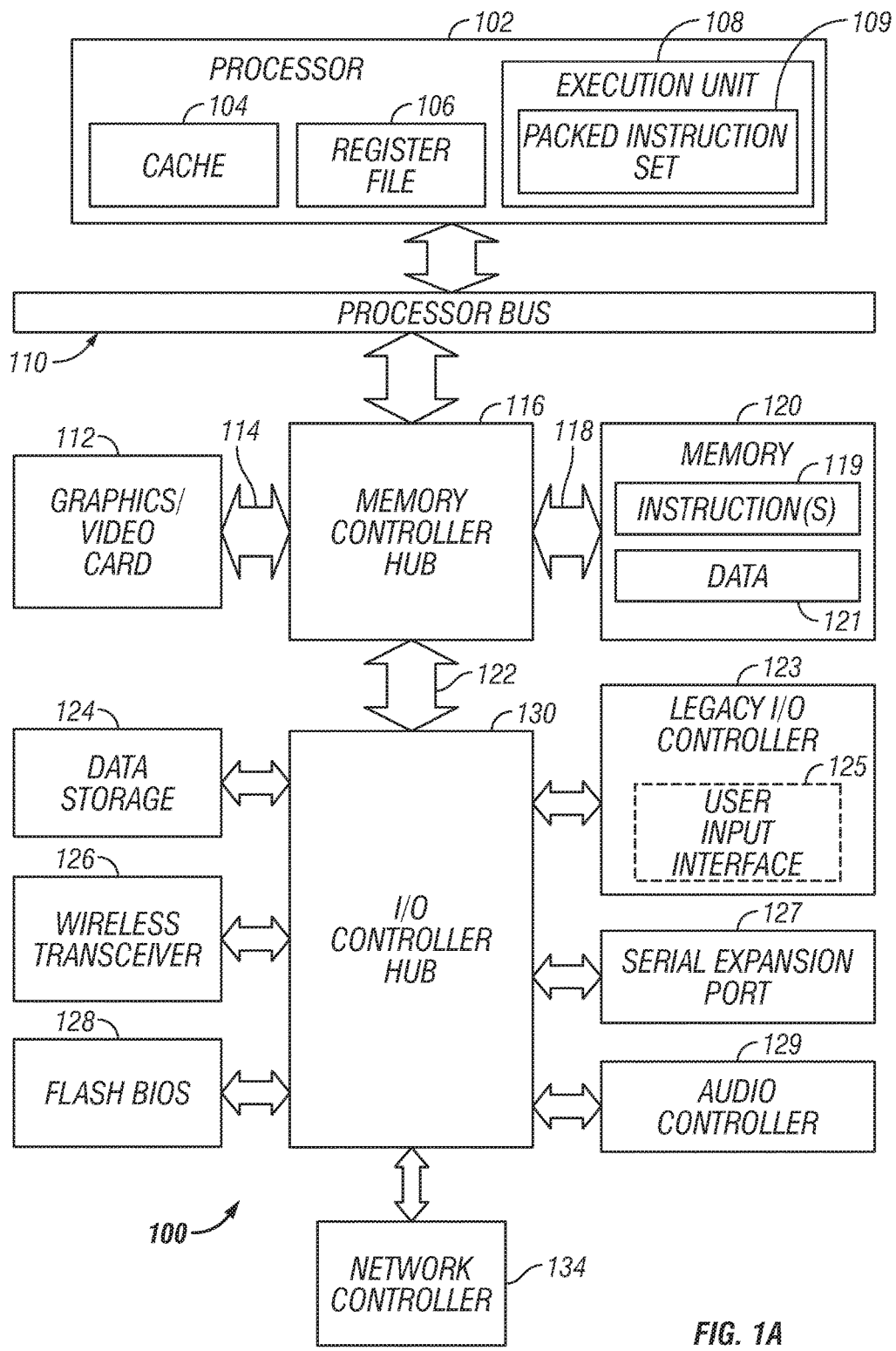
FIG. 1A is a block diagram of an exemplary computer system formed with a processor that may include execution units to execute an instruction, in accordance with embodiments of the present disclosure.

The following description describes an instruction and processing logic for implementing cache replacement using weighted tree structures in a class of replacement policies referred to as "Pseudo-LRU" or PLRU policies. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the operations of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in interne, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MIIVIX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MIIVIX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, California, although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
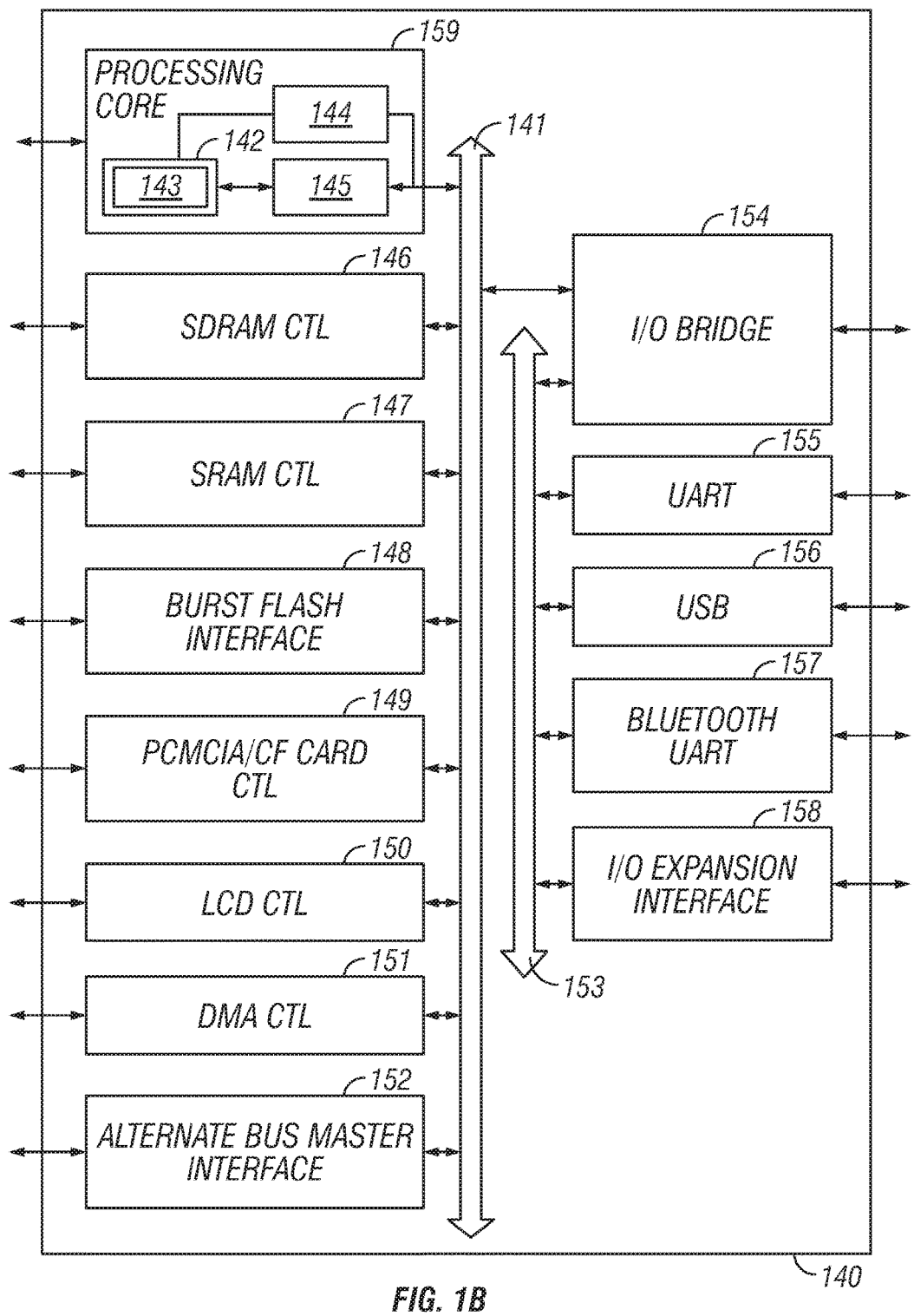
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
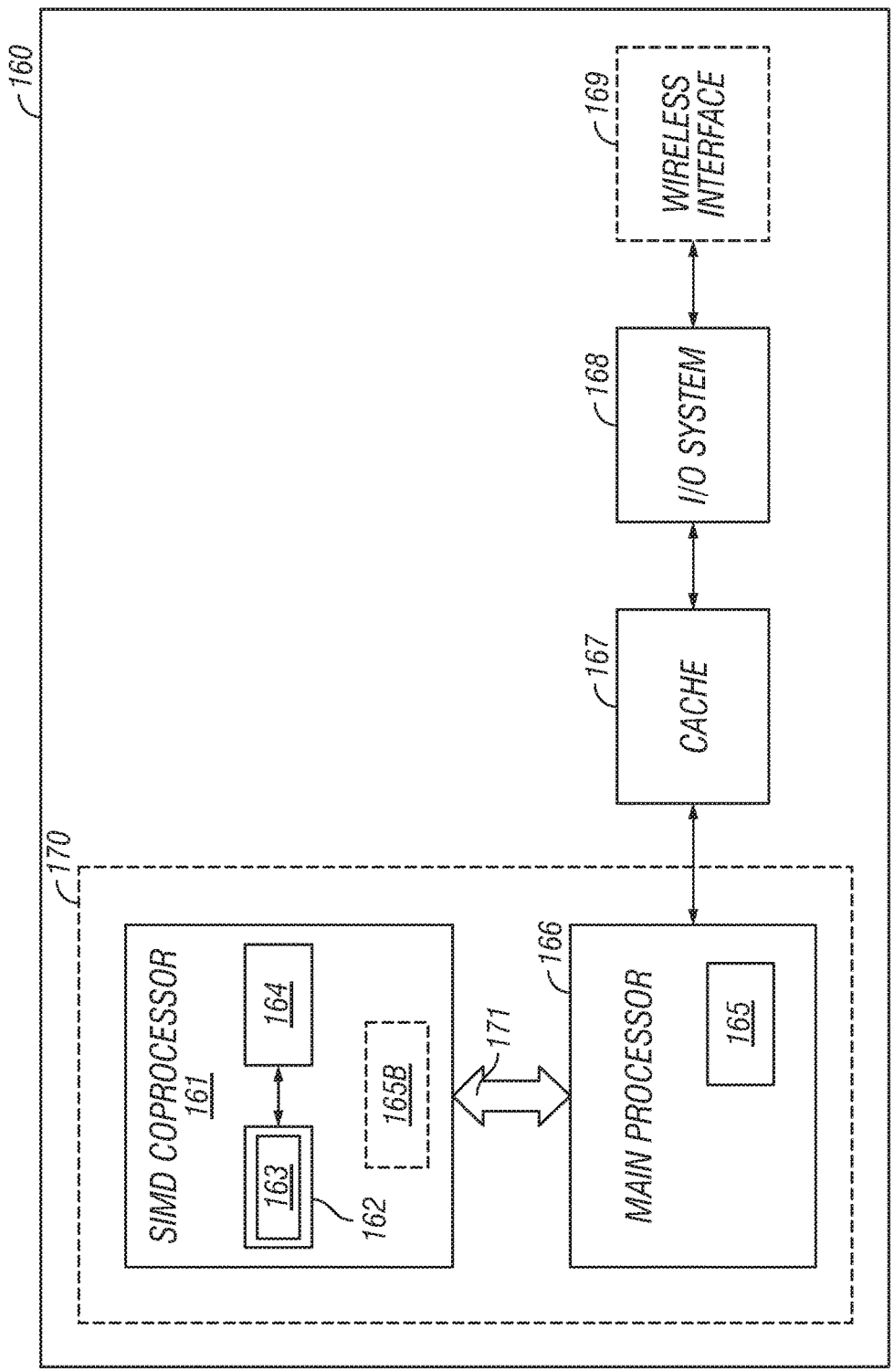
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
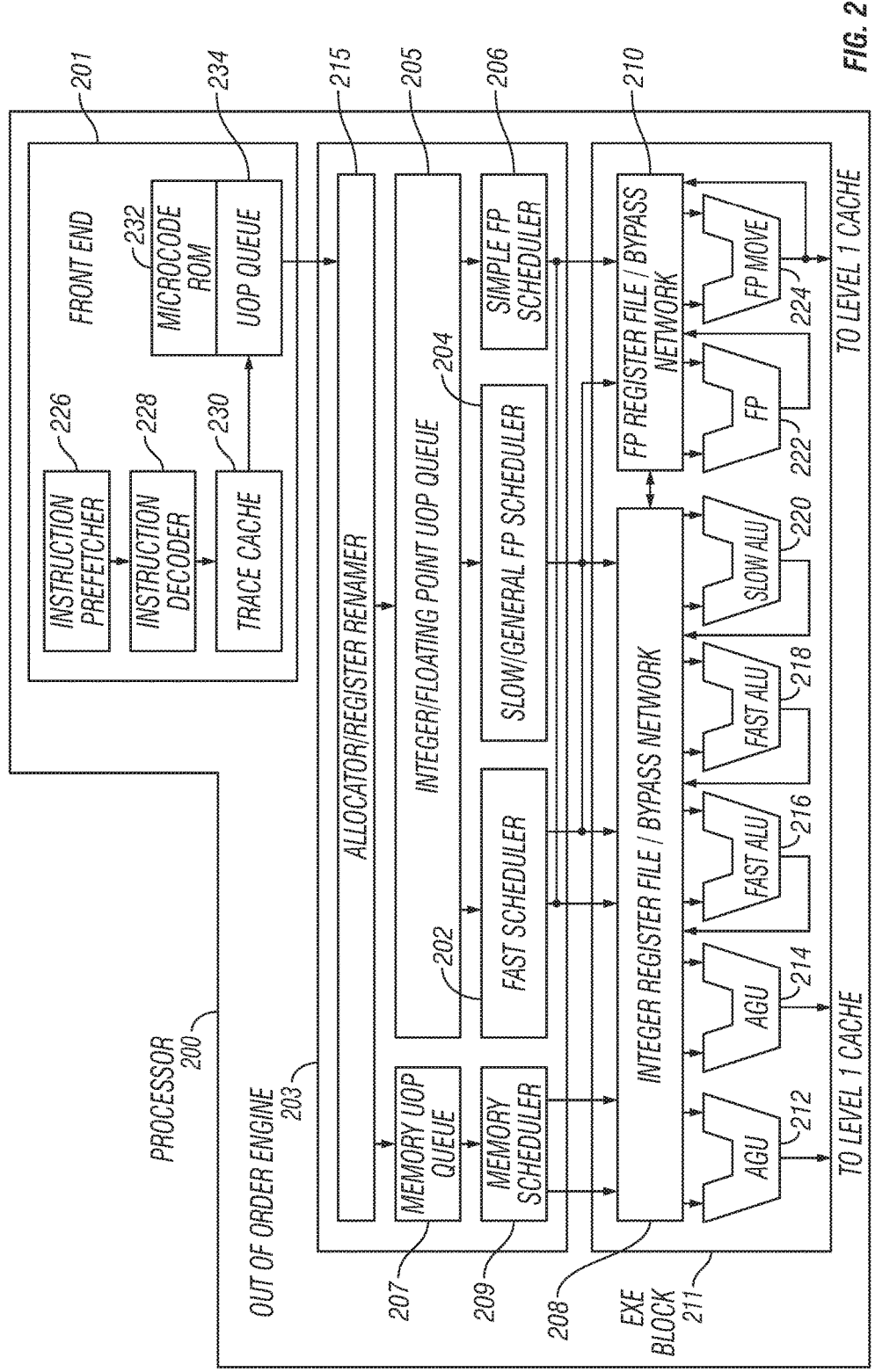
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, California. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
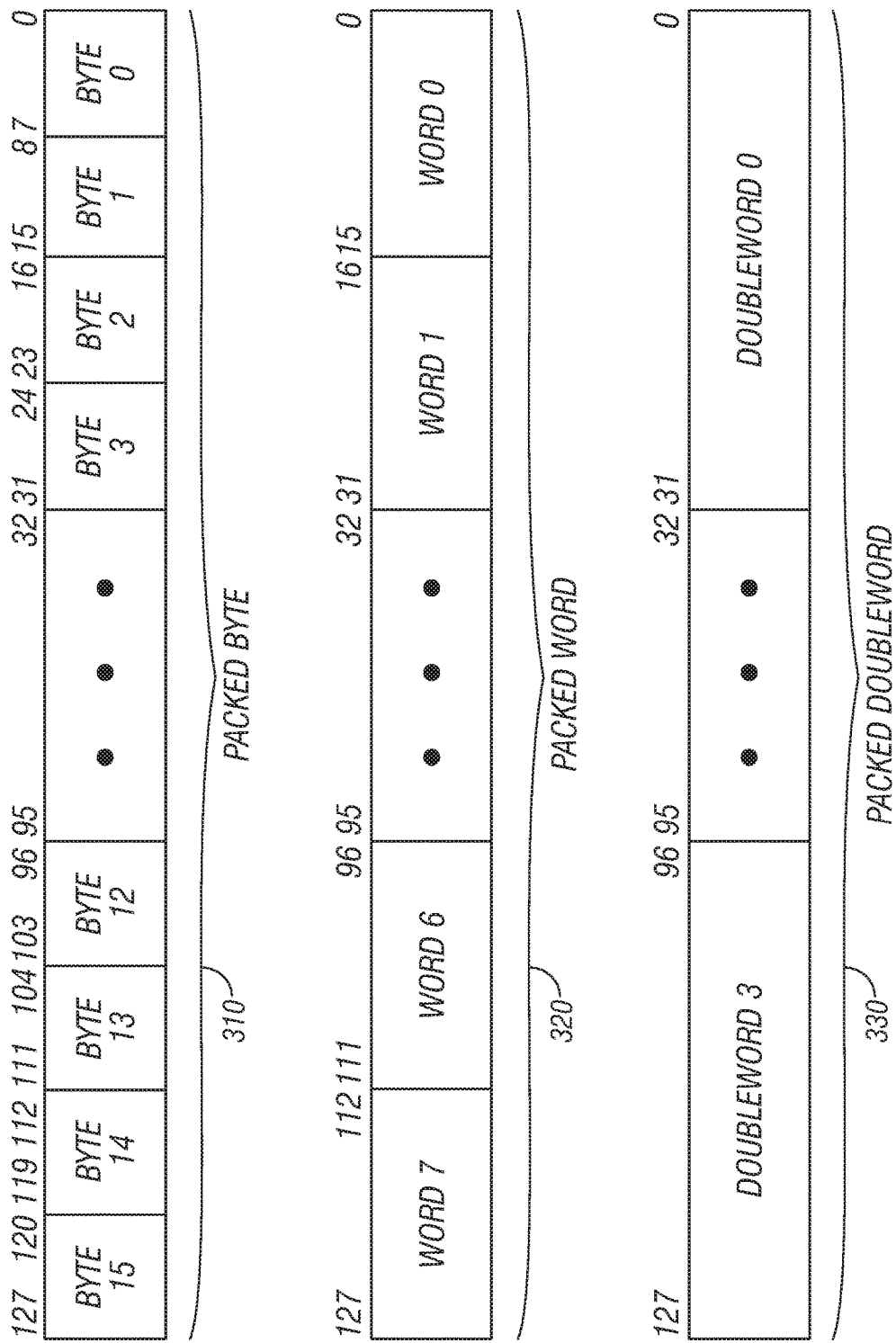
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
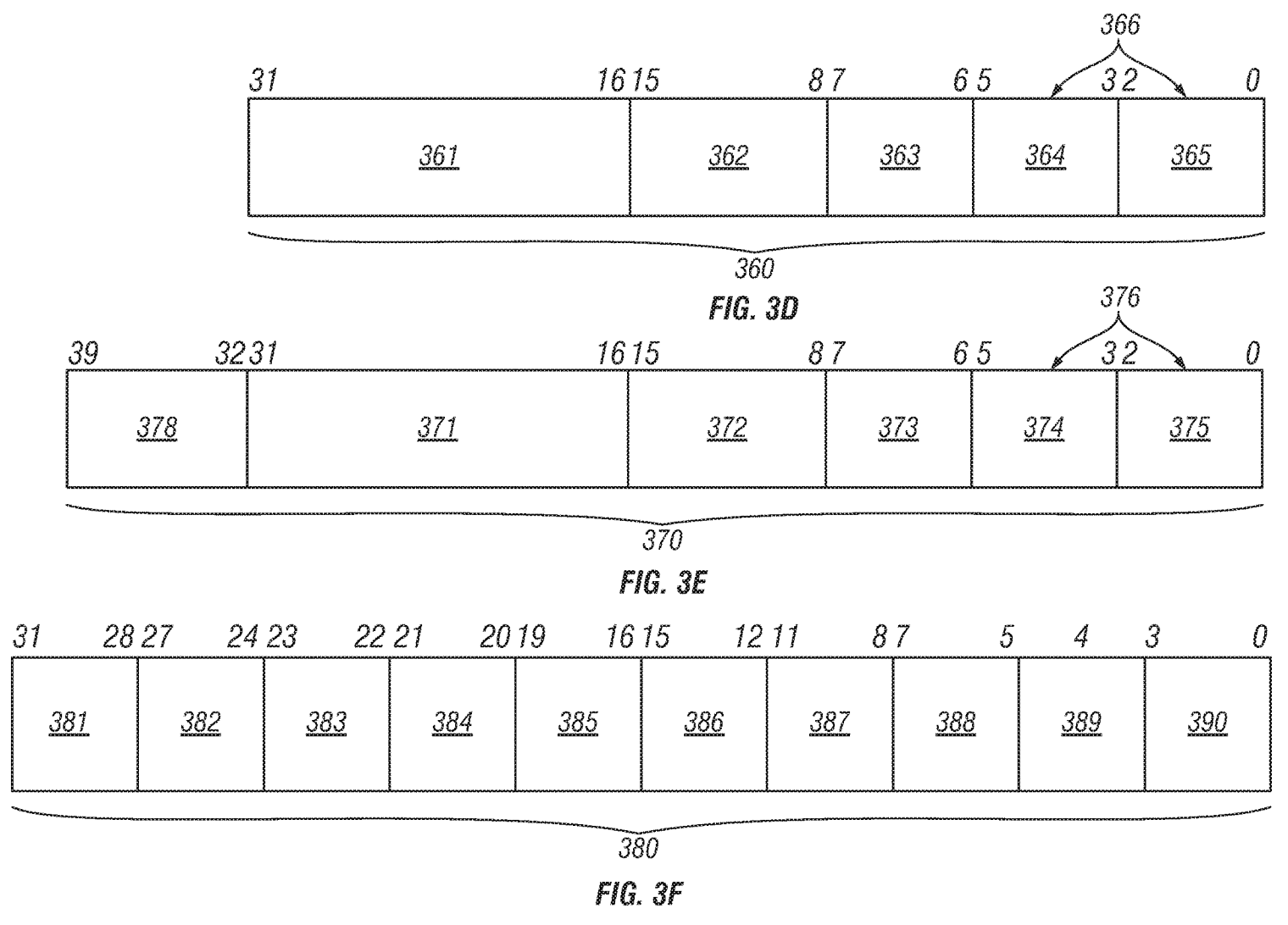

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
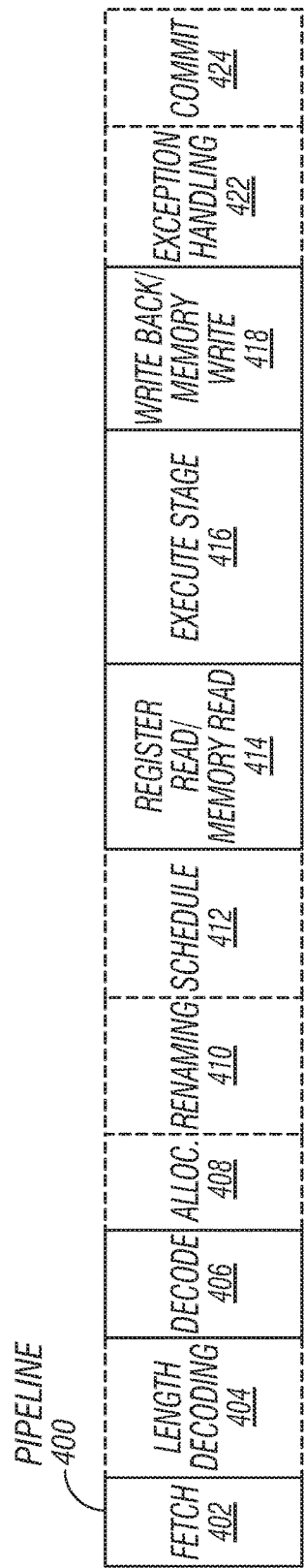
FIG. 4A is a block diagram illustrating an in-order pipeline and a register renaming stage, out-of-order issue/execution pipeline, in accordance with embodiments of the present disclosure.
Figure 4B:
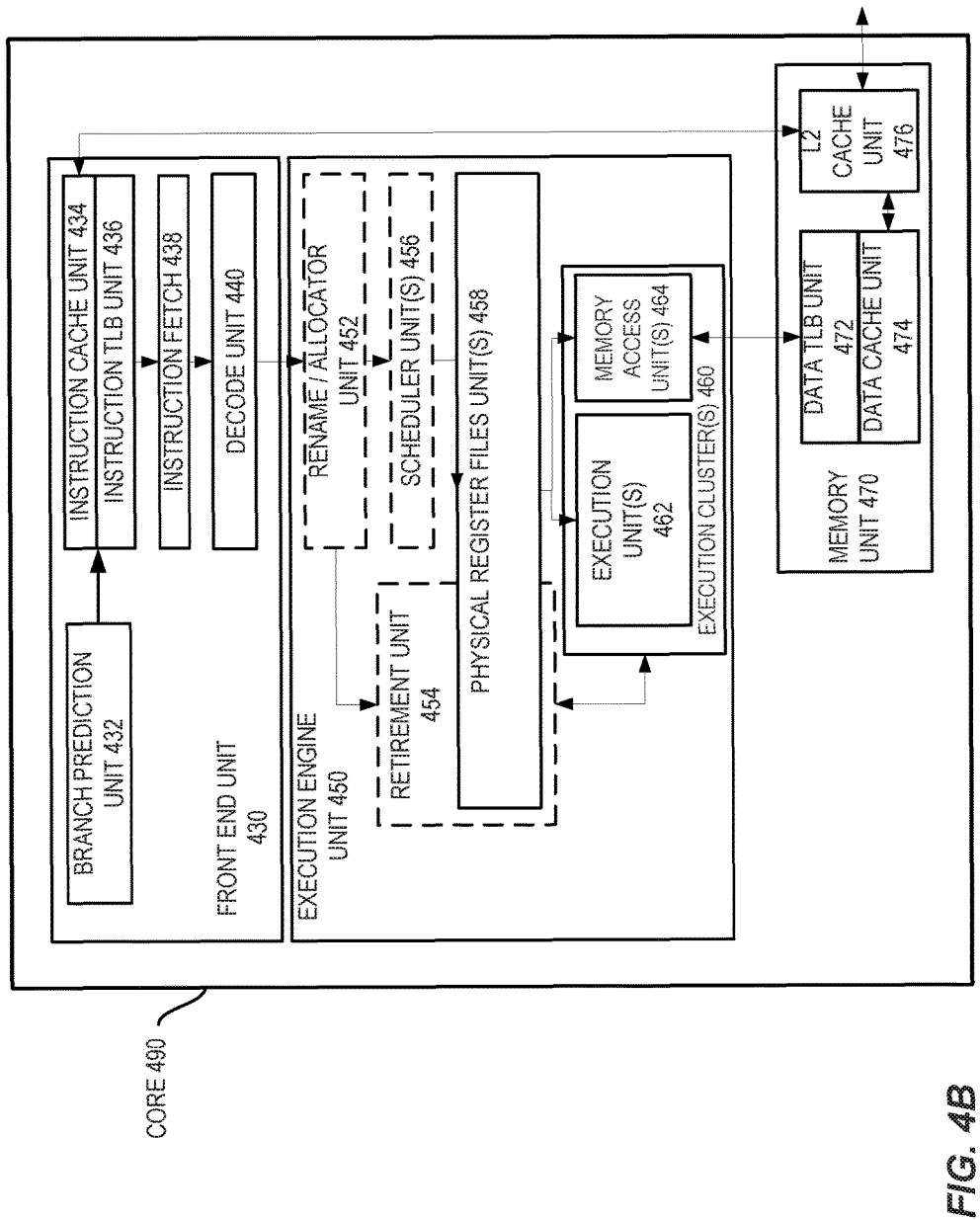
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470. In some embodiments, one or more elements of memory unit 470 may reside within core 490.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/ operations (e.g., a scalar integer pipeline, a scalar floating point/packed integer/packed floating point/vector integer/ vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory. While FIG. 4B illustrates an embodiment in which instruction cache unit 434, data cache unit 474, and level 2 (L2) cache unit 476 reside within core 490, in other embodiments one or more caches or cache units may be internal to a core, external to a core, or apportioned internal to and external to a core in different combinations.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/ allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyper-threading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
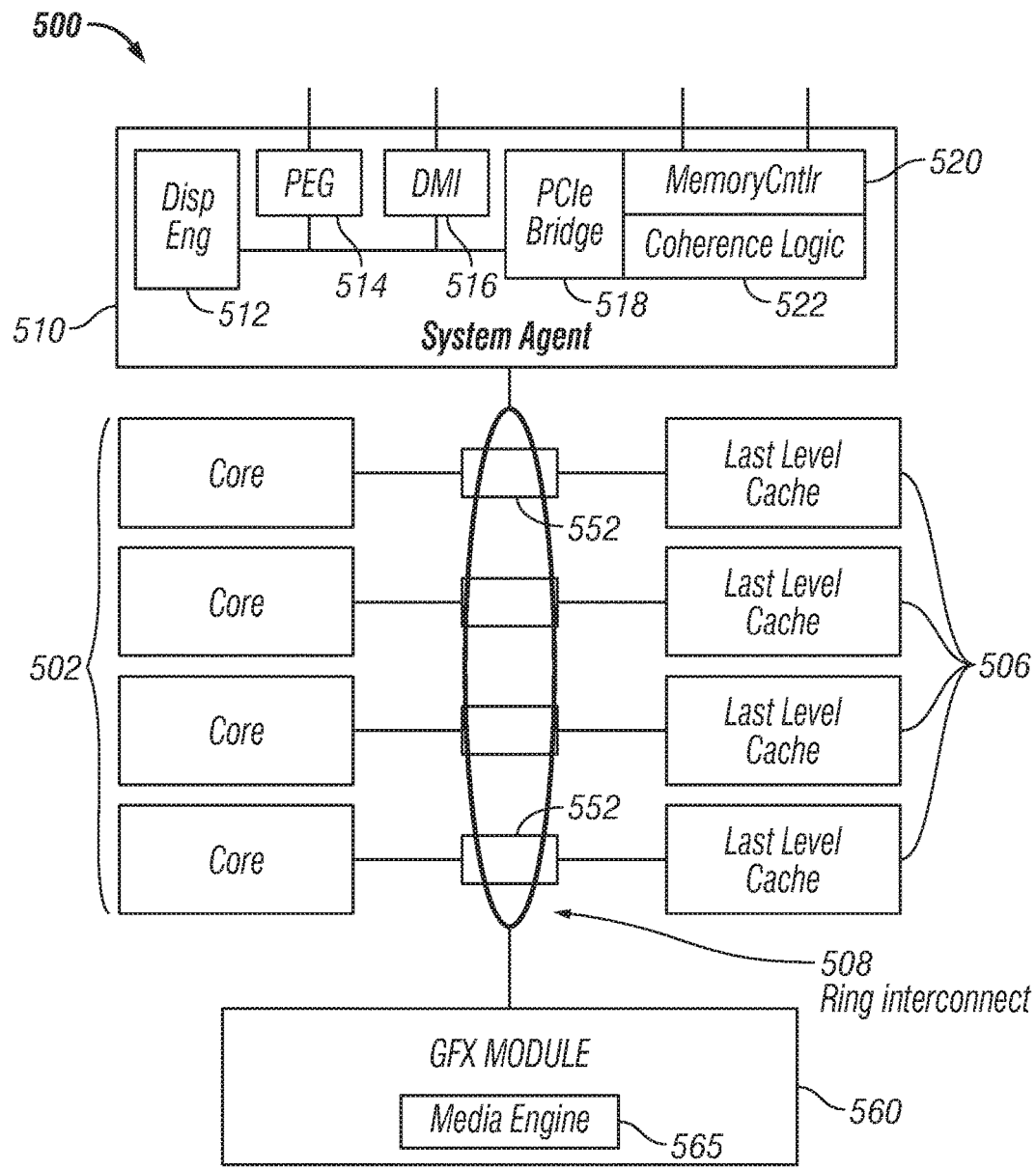
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
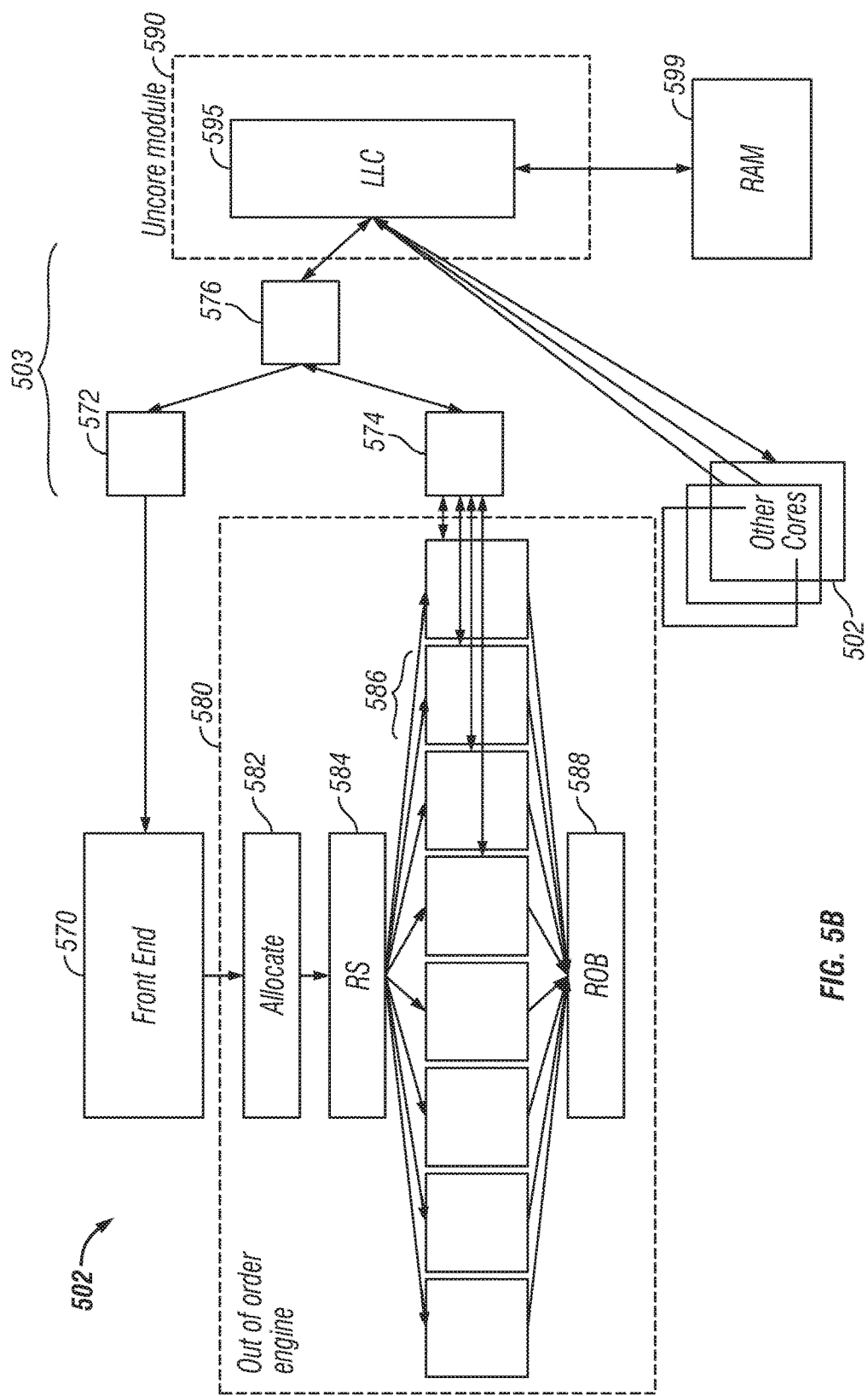
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574 through logic block 576. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
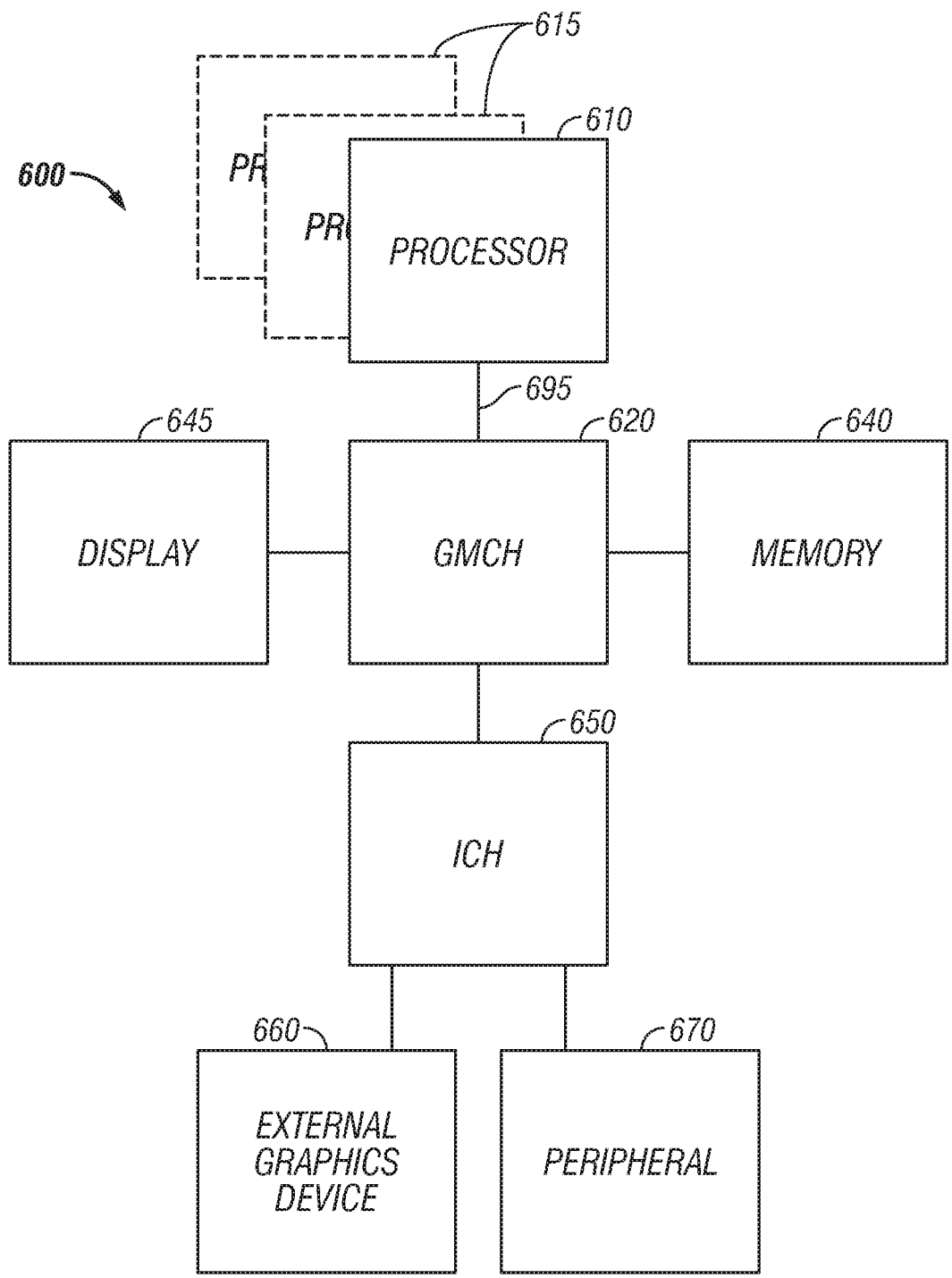
FIG. 6 is a block diagram of a system, in accordance with embodiments of the present disclosure.
Figure 7:
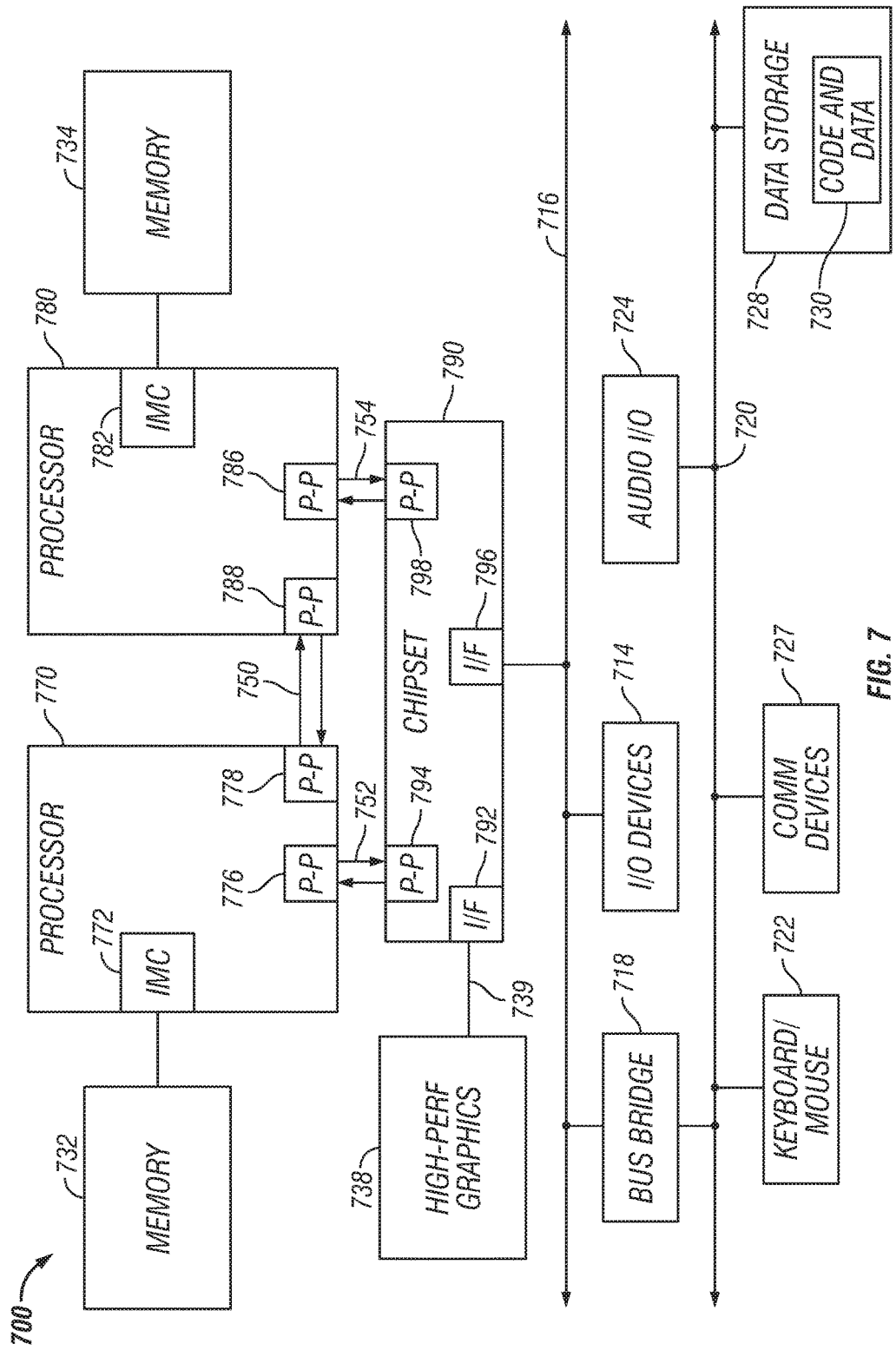
FIG. 7 is a block diagram of a second system, in accordance with embodiments of the present disclosure.
Figure 8:
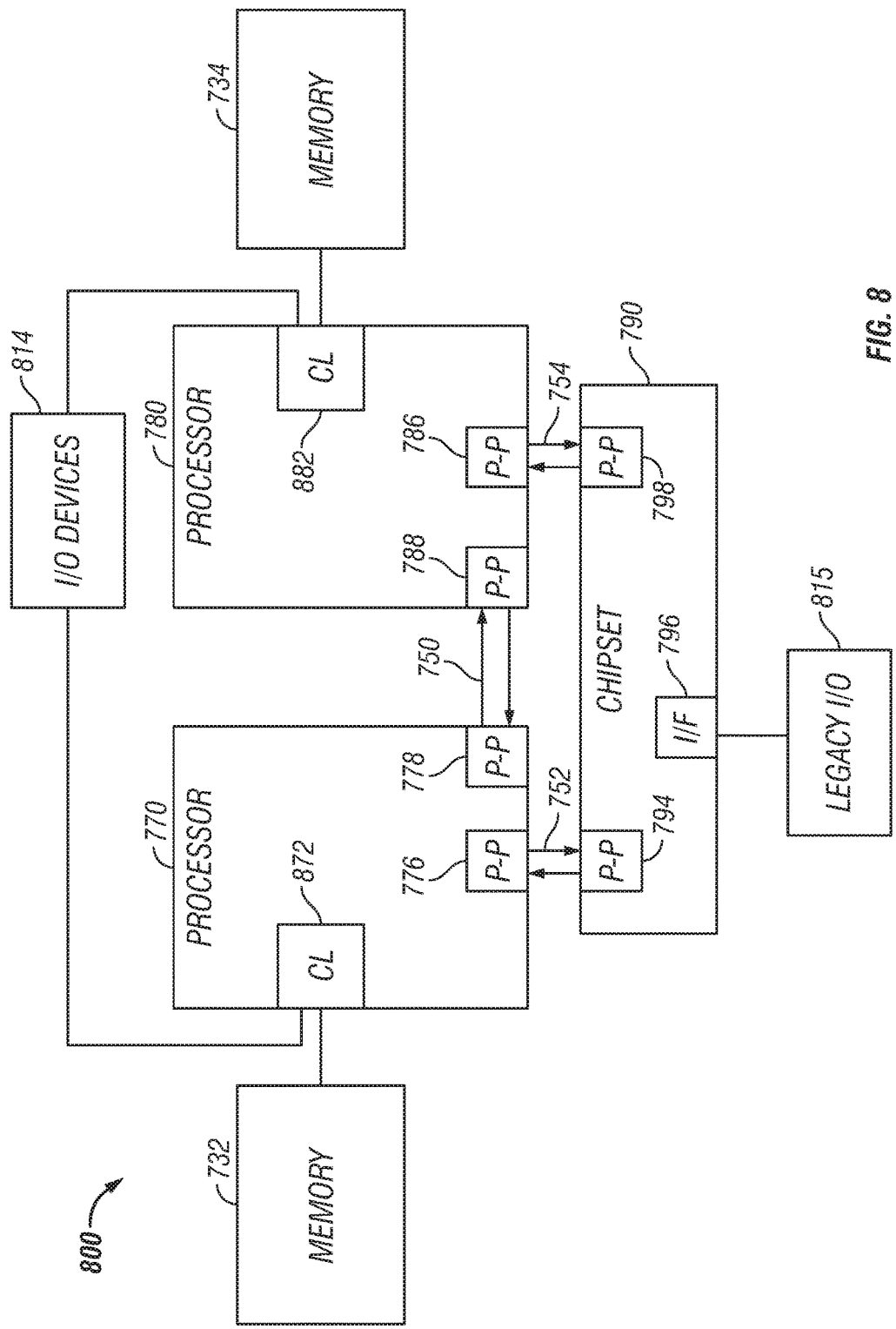
FIG. 8 is a block diagram of a third system in accordance with embodiments of the present disclosure.
Figure 9:
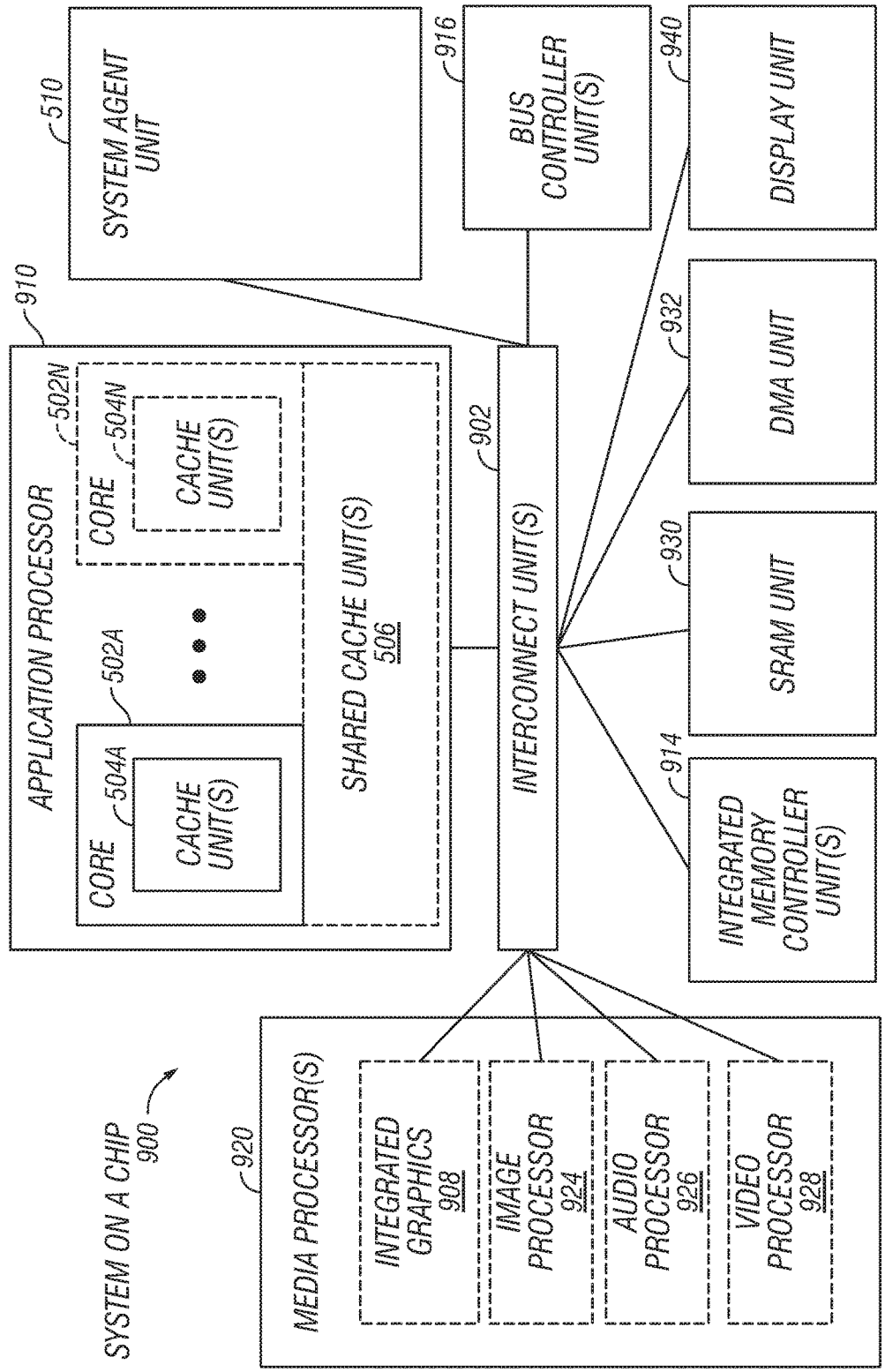
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610, 615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via interface 792 over a high-performance graphics bus 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N, including respective local caches 504A-N, and shared cache units 506; a system agent unit 510; a bus controller units 916; an integrated memory controller units 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
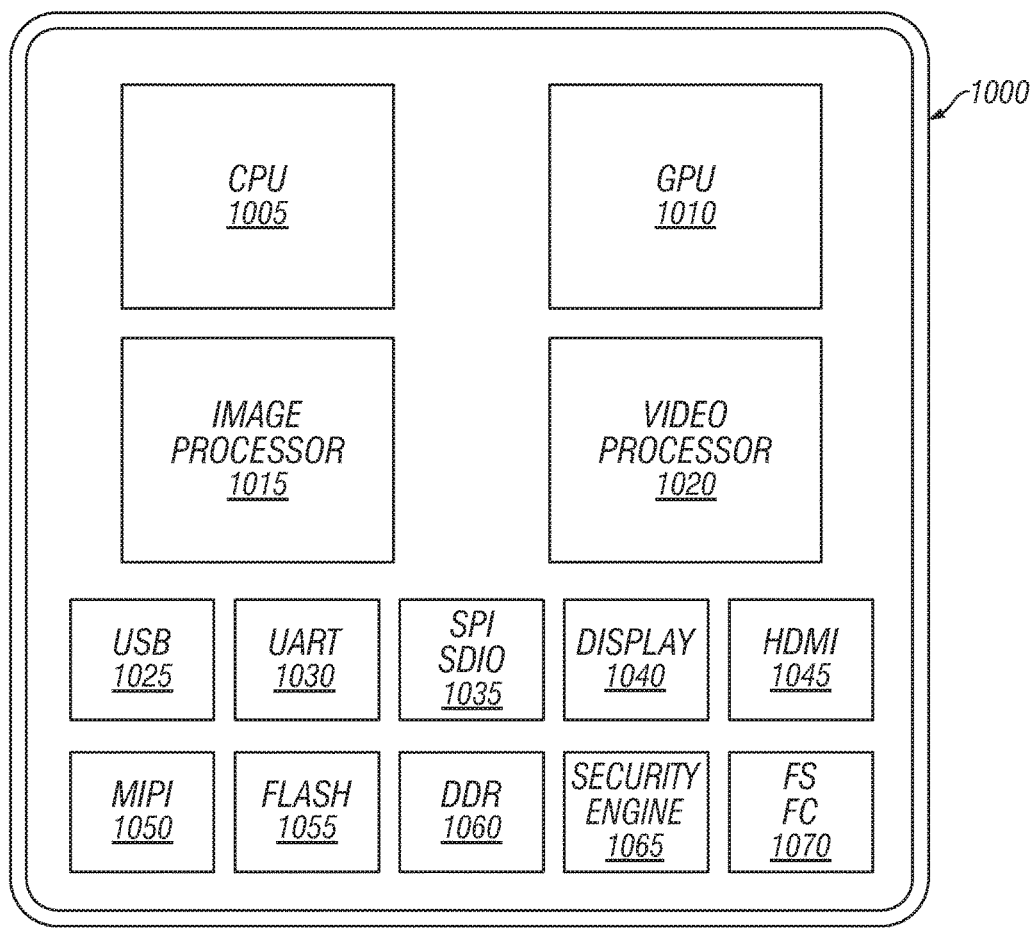
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
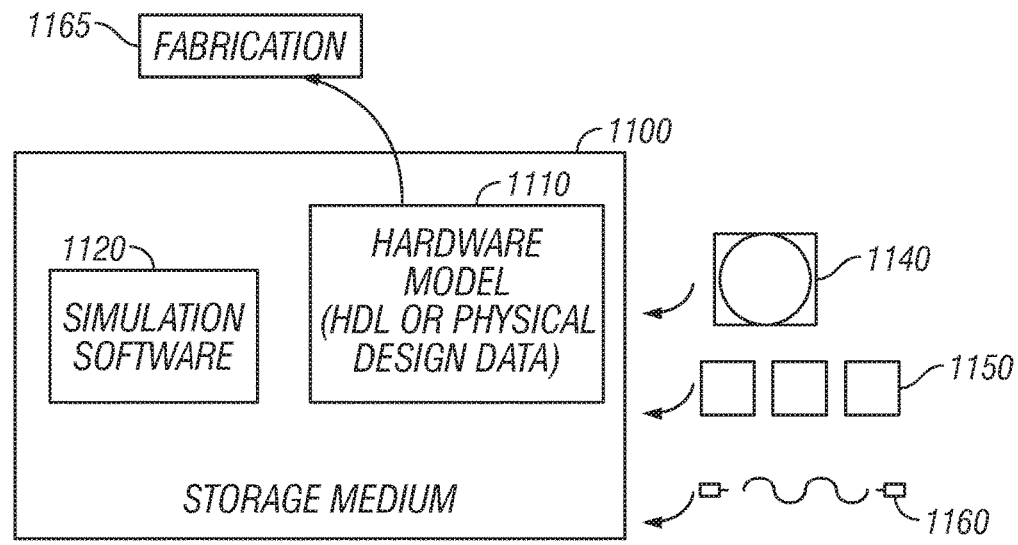
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
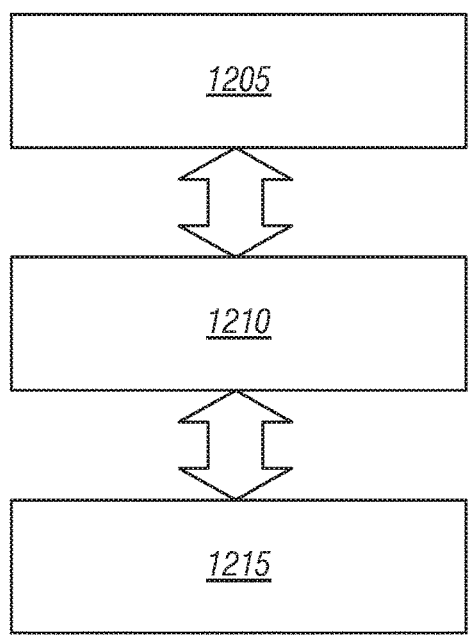
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
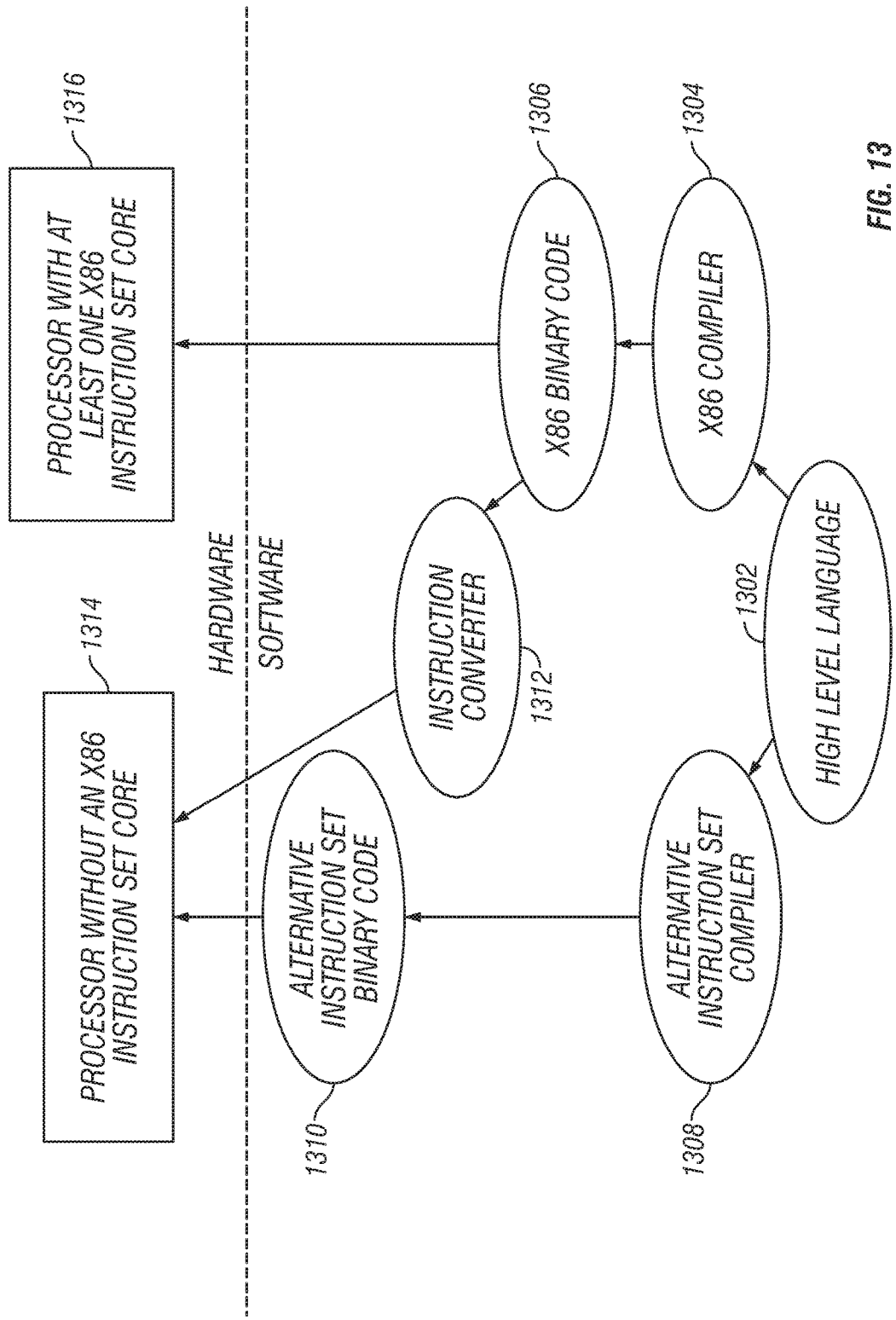
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
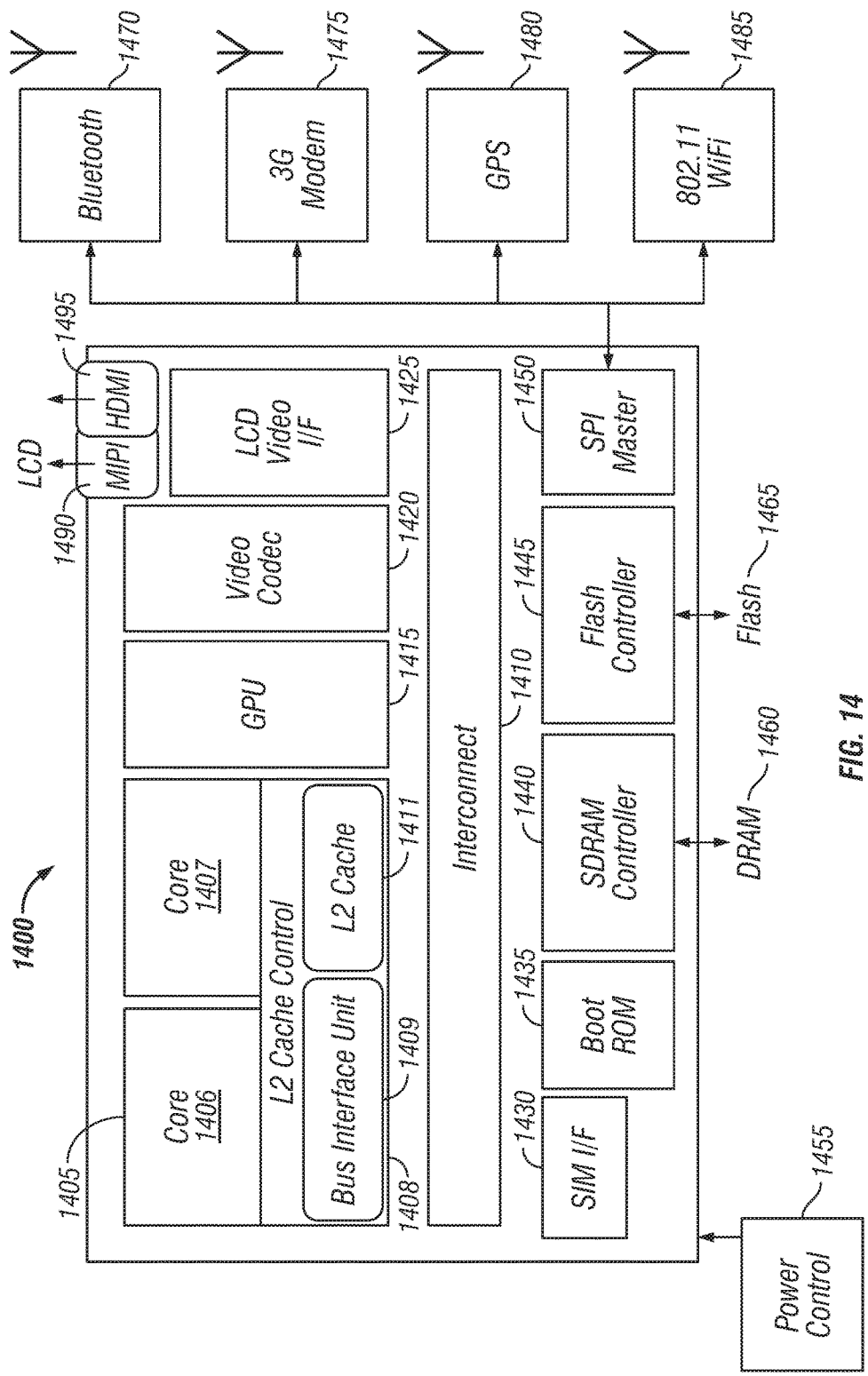
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 within a processor subsystem 1405, and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video codec 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11. Instruction set architecture 1400 may also include a power control unit 1455.

Figure 15:
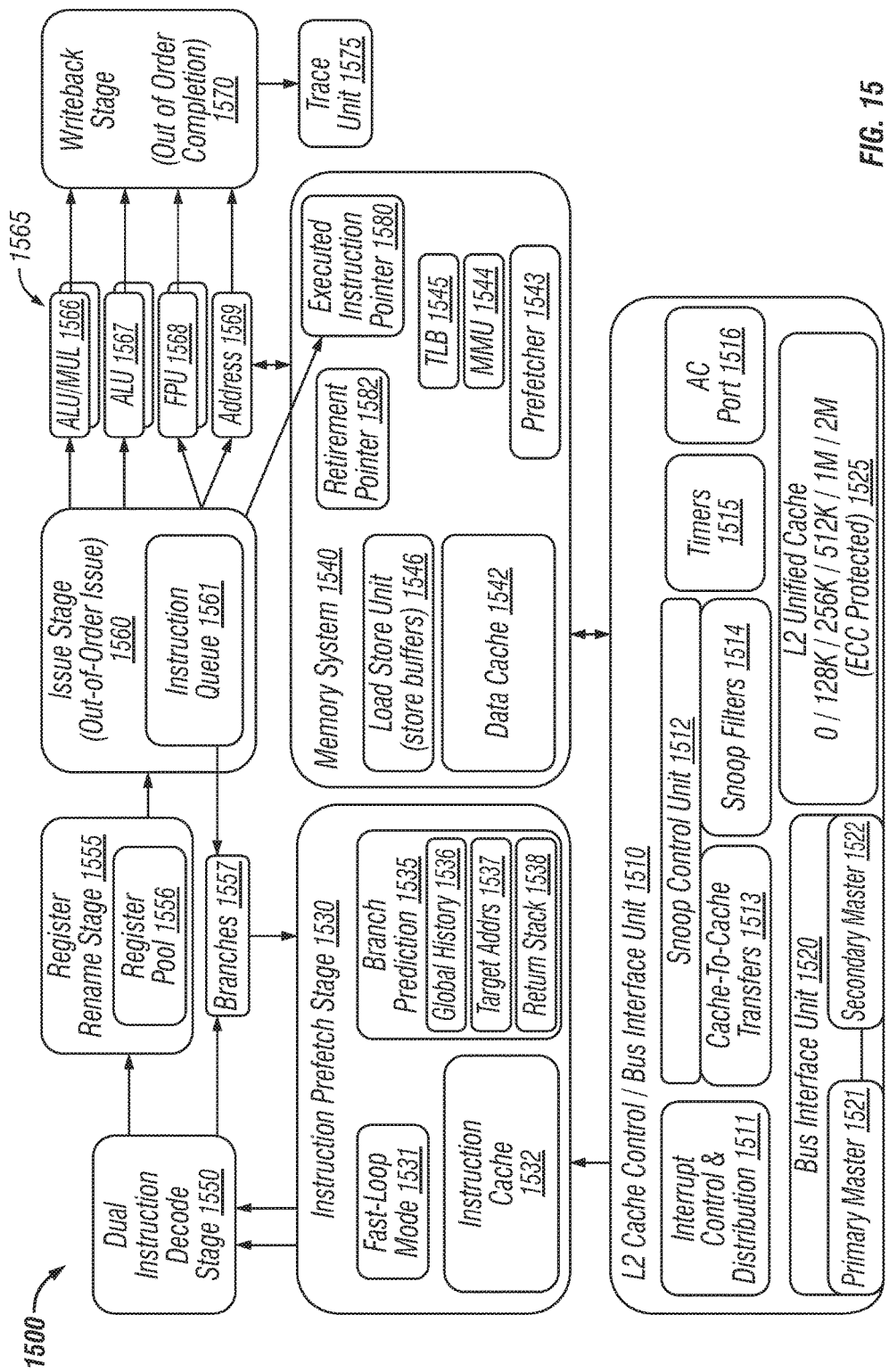
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128k, 256k, 512k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1510 may include an interrupt control and distribution unit 1511 for generating interrupts and other communications to other portions of a processor or electronic device. In one embodiment, bus interface unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers and a data cache 1542. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
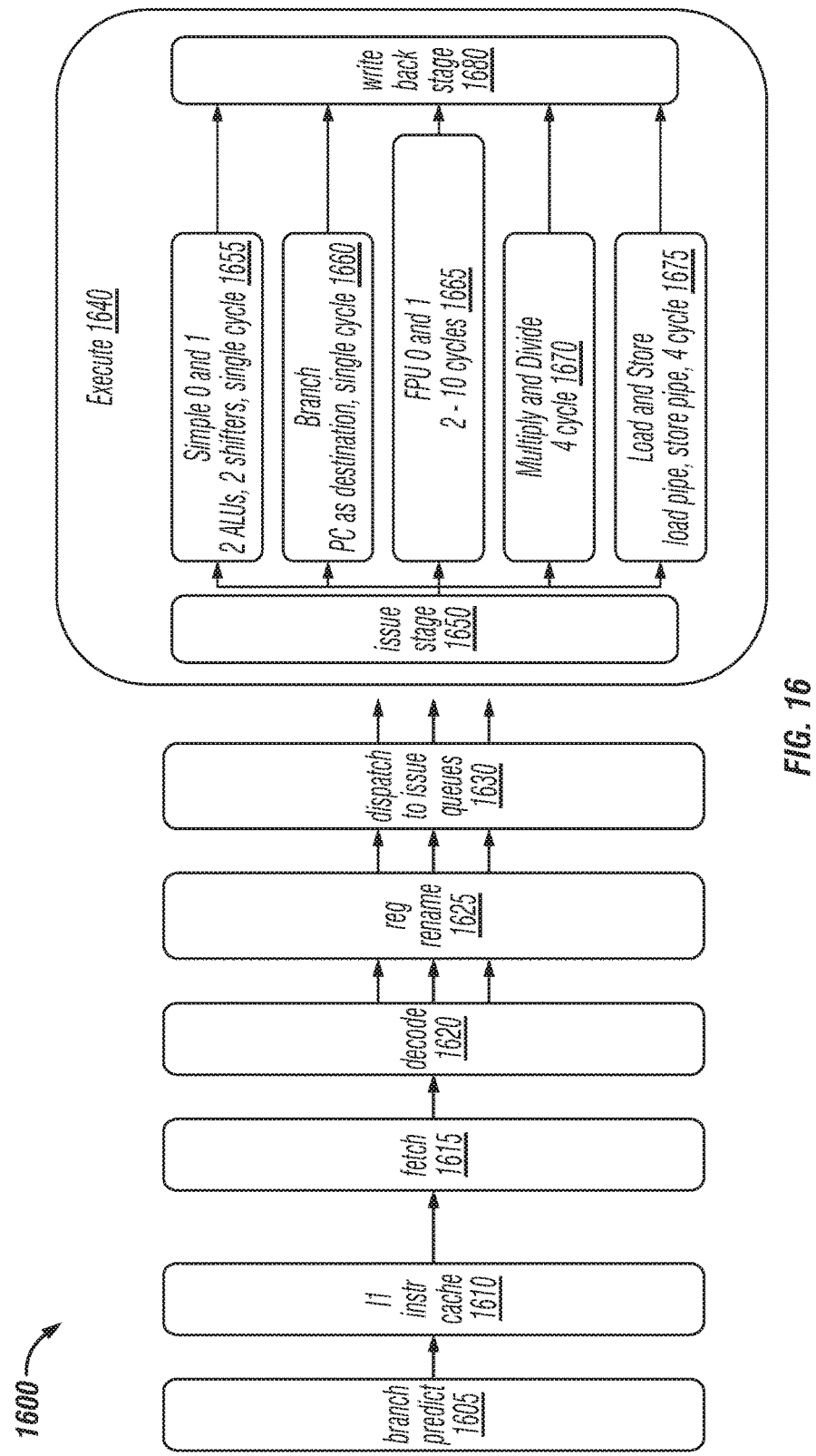
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
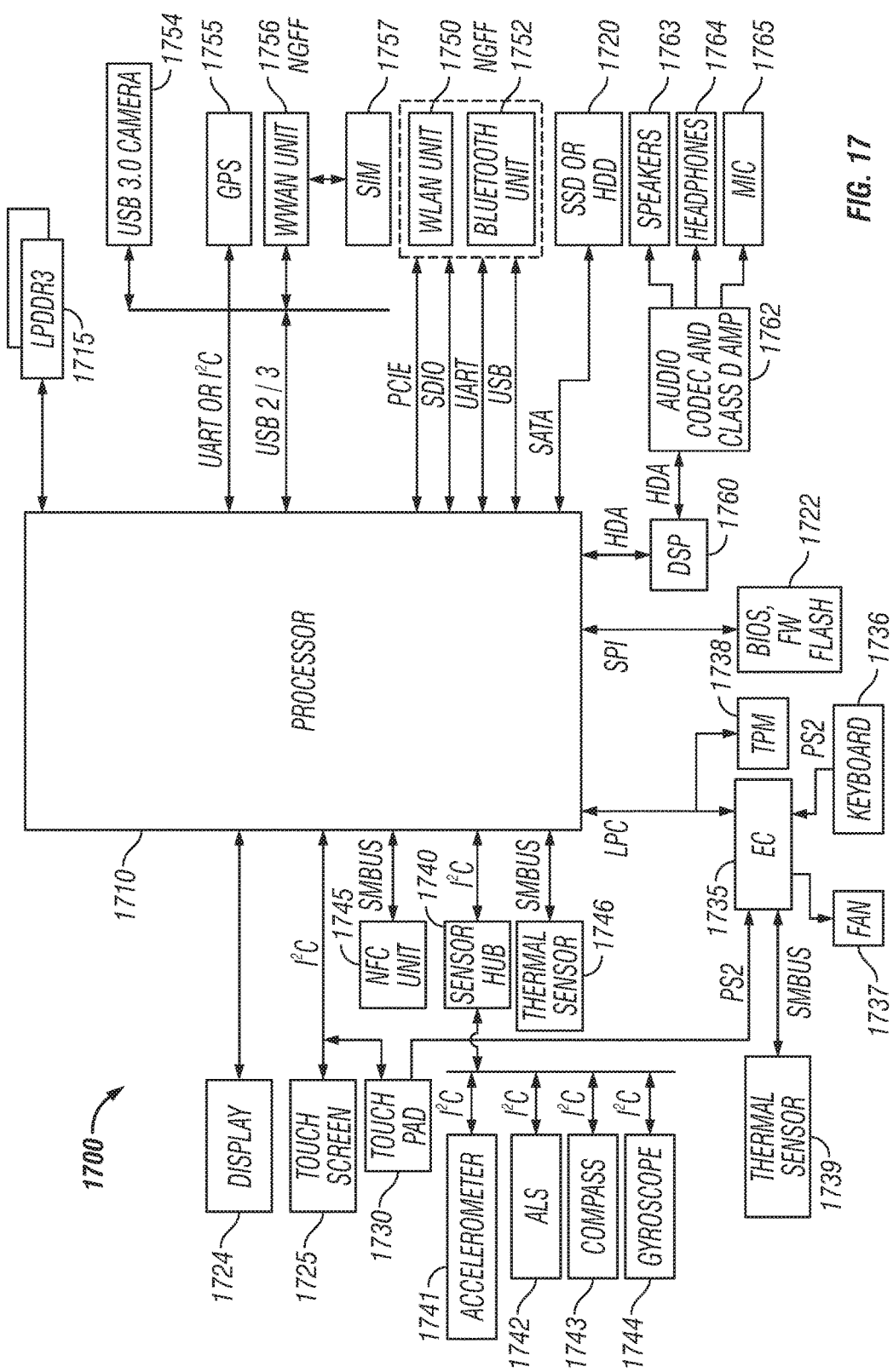
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1755, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Embodiments of the present disclosure involve hardware circuitry or logic for implementing replacement of memory elements in an associative memory using weighted tree structures. More specifically, the weighted tree structures may include tree structures of a class of replacement policies commonly used in associative storage structures, such as caches and TLBs. These replacement policies, referred to as "Pseudo-LRU" or PLRU policies, were created to approximate the performance of true Least Recently Used (LRU) policies, but with lower design costs and less power consumption. In at least some embodiments of the present disclosure, a system may include hardware circuitry or logic to implement a replacement mechanism that includes a binary PLRU tree. In general, existing binary tree based PLRU policies do not perform well in associative storage structures that include a number of ways other than a power-of-two number of ways. For example, when the set associativity for an associative memory is not based on a power-of-two number of ways, the PLRU tree is imbalanced, resulting in a poorer approximation of true LRU and worse algorithmic performance than when the set associativity includes a power-of-two number of ways. In some systems, one or more associative memory structures within a processor, such as a data cache, may not be implemented using a power-of-two number of ways in order to optimize for area or power. In at least some embodiments of the present disclosure, the systems described herein may implement a weighted PLRU tree structure. As described in more detail herein, the use of a weighted PLRU tree structure may allow a PLRU policy to perform at levels close to those of true LRU policies even when the PLRU tree structure is imbalanced.

Figure 18:
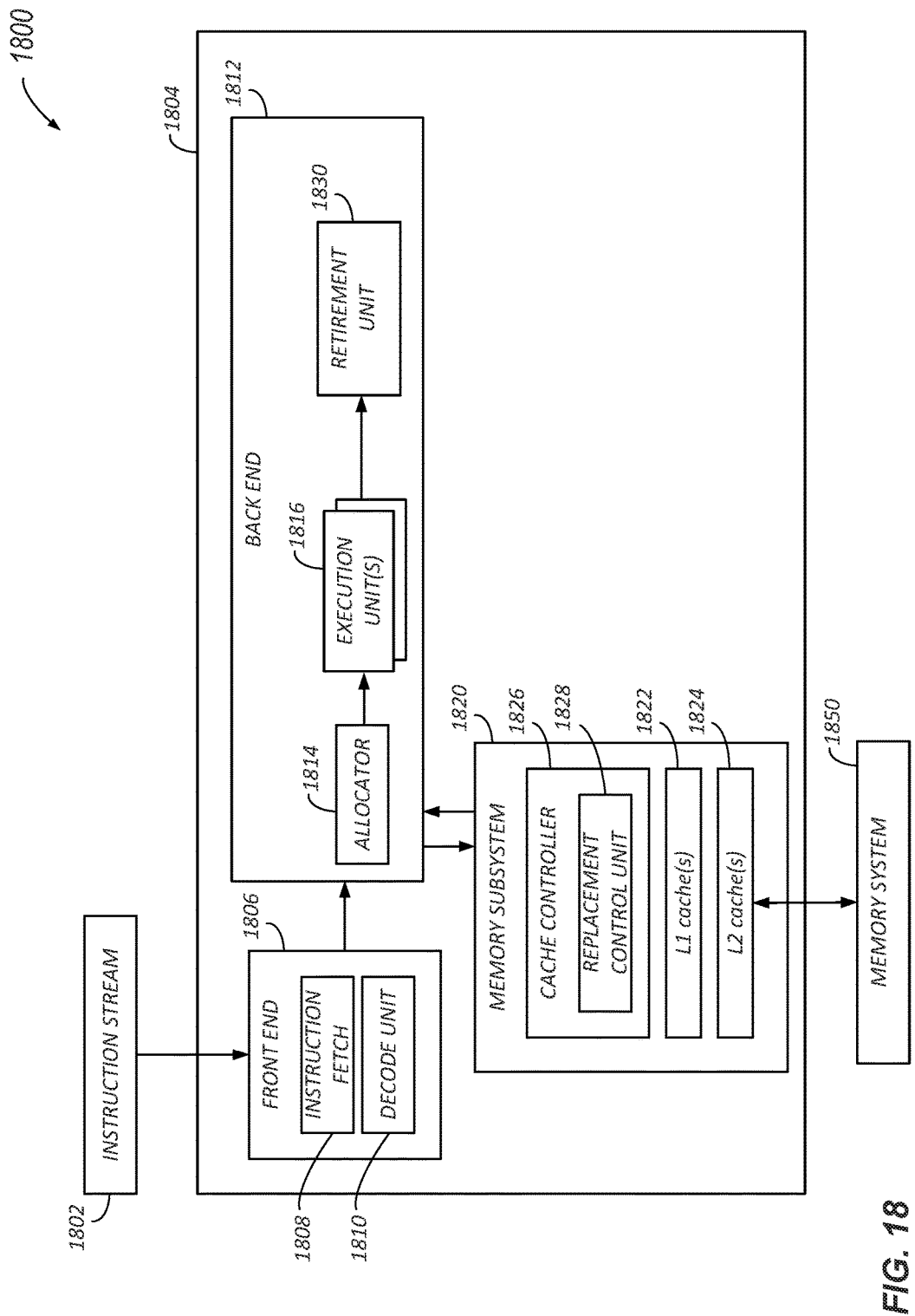
FIG. 18 is a block diagram illustrating an example system including a cache controller for cache replacement using weighted PLRU trees, according to embodiments of the present disclosure.

FIG. 18 is a block diagram illustrating an example system 1800 including a cache controller for cache replacement using weighted PLRU trees, according to embodiments of the present disclosure. The cache controller may include hardware circuitry or logic to perform cache replacement in accordance with a PLRU policy using weighted PLRU trees. In at least some embodiments, these weighted PLRU trees may employ "replacement weights" to rebalance replacement among otherwise imbalanced PLRU sub-trees. In some embodiments, counters may be used to achieve the weighting. In other embodiments, a Pseudo-Random Number Generator (PRNG) may control PLRU state transition probabilities according to probabilistic weights derived from the way configuration of the cache. In such embodiments, the transition probabilities may counteract the natural bias in the standard PLRU operation of an imbalanced tree.

In at least some embodiments of the present disclosure, system 1800 may include hardware circuitry or logic to apply a cache replacement policy that uses weighted PLRU trees to one or more associative memory structures within a processor. For example, system 1800 may include one or more caches or TLBs that store data in a plurality of ways organized in an asymmetric tree structure in which each way includes one or more memory elements (e.g., cache lines or entries), and in which the number of ways is other than a power of two.

System 1800 may include a processor, SoC, integrated circuit, or other mechanism. For example, system 1800 may include processor core 1804. Although processor core 1804 is shown and described as an example in FIG. 18, any suitable mechanism may be used. Processor core 1804 may include any suitable mechanisms for cache line eviction and cache line insertion, including those that use weighted PLRU trees to determine the ways to be victimized by a cache replacement operation. In one embodiment, such mechanisms may be implemented in hardware. Processor core 1804 may be implemented fully or in part by the elements described in FIGS. 1-17.

Instructions to be executed on processor core 1804 may be included in instruction stream 1802. Instruction stream 1802 may be generated by, for example, a compiler, just-in-time interpreter, or other suitable mechanism (which might or might not be included in system 1800), or may be designated by a drafter of code resulting in instruction stream 1802. For example, a compiler may take application code and generate executable code in the form of instruction stream 1802. Instructions may be received by processor core 1804 from instruction stream 1802. Instruction stream 1802 may be loaded to processor core 1804 in any suitable manner. For example, instructions to be executed by processor core 1804 may be loaded from storage, from other machines, or from other memory, such as memory system 1850. The instructions may arrive and be available in resident memory, such as RAM, and may be fetched from storage to be executed by processor core 1804. The instructions may be fetched from resident memory by, for example, a prefetcher or fetch unit (such as instruction fetch unit 1808).

Processor core 1804 may include a front end 1806 and a back end 1812. Front end 1806 may include an instruction fetch pipeline stage (such as instruction fetch unit 1808) and a decode pipeline stage (such as decide unit 1810). Front end 1806 may receive and decode instructions from instruction stream 1802 using decode unit 1810. The decoded instructions may be dispatched, allocated, and scheduled for execution by an allocation stage of back end 1812 (such as allocator 1814) and allocated to specific execution units 1816 within back end 1812 for execution. In embodiments in which system 1800 includes a multicore processor, each of multiple processor cores 1804 may include at least a portion of a front end 1806, and at least a portion of a back end 1812.. One or more specific instructions to be executed by processor core 1804 may be included in a library defined for execution by processor core 1804. In another embodiment, specific instructions may be targeted by particular portions of processor core 1804. For example, processor core 1804 may recognize an attempt in instruction stream 1802 to execute a vector operation in software and may issue the instruction to a particular one of execution units 1816 to execute the instruction.

During execution, access to data or additional instructions (including data or instructions resident in memory system 1850) may be made through memory subsystem 1820. Moreover, results from execution may be stored in memory subsystem 1820 and may subsequently be flushed to memory system 1850. Memory subsystem 1820 may include, for example, memory, RAM, or a cache hierarchy, which may include one or more Level 1 (L1 ) caches 1822 or Level 2 (L2 ) caches 1824, some of which may be shared by multiple processor cores 1804. In other embodiments, one or more caches or cache units may be internal to a core, external to a core, or apportioned internal to and external to a core in different combinations. After execution by execution units 1816, instructions may be retired by a writeback stage or retirement stage in retirement unit 1830 within back end 1812.

Memory subsystem 1820 may also include a cache controller 1826. Cache controller 1826 may control the assignment of various L1 caches 1822 and L2 caches 1824 for the use of execution units 1816 within back end 1812. In at least some embodiments, cache controller 1826 may include hardware circuitry or logic to control the insertion of cache lines into the L1 caches 1822 and L2 caches 1824 and the eviction of cache lines from the L1 caches 1822 and L2 caches 1824 in accordance with one or more cache replacement policies for the caches. For example, cache controller 1826 may implement a cache replacement policy for the L1 caches 1822 and/or L2 caches 1824 using weighted PLRU trees. In some embodiments, cache controller 1826 may include a replacement control unit 1828. In other embodiments, a replacement control unit may reside outside of cache controller 1826. Replacement control unit 1828 may include hardware circuitry or logic to implement cache replacement using PLRU tree structures. For example, replacement control unit 1828 may include a decision node indicator whose value determines the side of the PLRU tree structure to which a next cache line replacement operation is directed. Replacement control unit 1828 may also include circuitry to cause the decision node indicator to point a majority side of the tree structure in response to a miss in the cache while the decision node indicator points to the minority side of the tree structure. Replacement control unit 1828 may also include circuitry to determine whether or not to cause the decision node indicator to point to the minority side of the tree structure in response to a cache miss while the decision node indicator points to the majority side of the tree structure. In at least some embodiments, this determination may be dependent on a current replacement weight value.

Figure 19A:
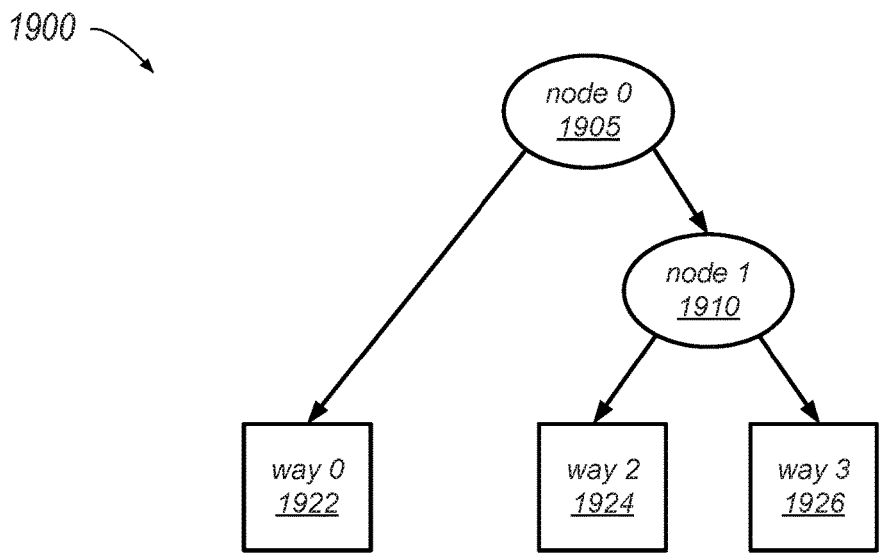
FIGS. 19A to 19C illustrate examples of asymmetric PLRU trees, according to embodiments of the present disclosure.
Figure 19B:
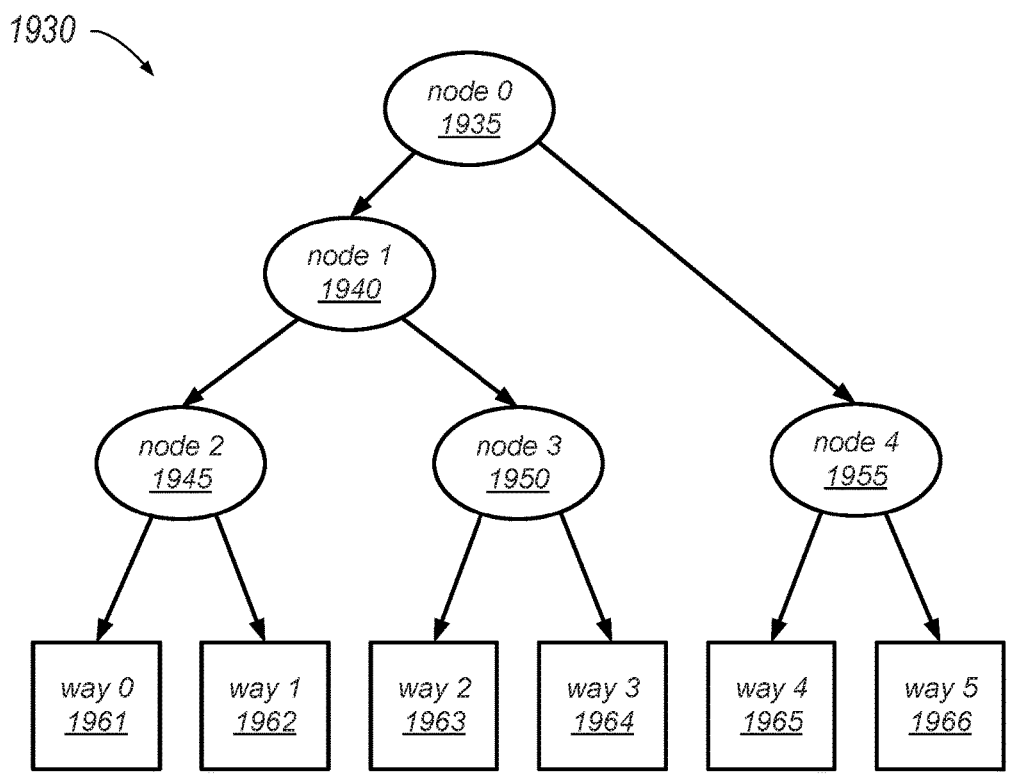
Figure 19C:
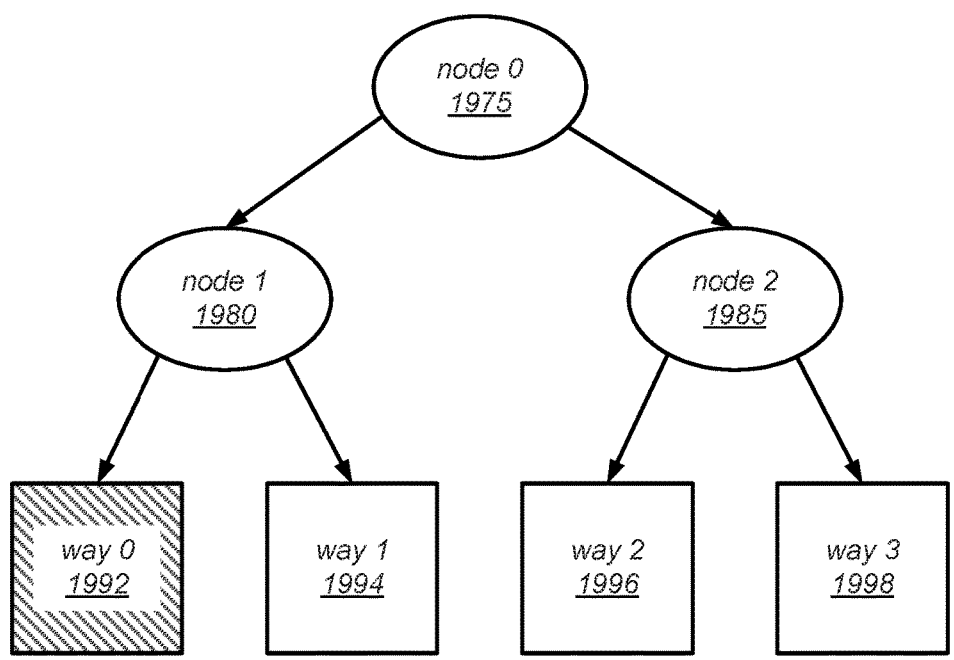

FIGS. 19A to 19C illustrate examples of asymmetric PLRU trees to which the cache replacement techniques described herein may be applied, according to embodiments of the present disclosure. For example, FIG. 19A illustrates an asymmetric PLRU tree 1900 for an associative memory, such as a cache, that includes four ways. In this example, the minority side, which is on the left side of PLRU tree 1900, includes a single way, labeled as way 0 (1922). In this example, the majority side of asymmetric PLRU tree 1900, which is on the right side of PLRU tree 1900, includes two ways, labeled as way 2 (1924) and way 3 (1926). From the perspective of decision node 0 (1905), there is a 2:1 ratio between its two sub-trees, meaning the majority sub-tree and the minority sub-tree have available leaves in a 2:1 ratio. In the example illustrated in FIG. 19A, decision node 0 (1905) directs each cache replacement operation either to the left side, which includes only way 0 (1922), or to the right side of PLRU tree 1900, dependent on the state of a replacement indicator, such as an LRU value, associated with decision node 0 (1905). In one example embodiment, if the value of the replacement indicator is zero, the cache replacement operation may be directed to the left, and if the value of the replacement indicator is one, the cache replacement operation may be directed to the right. For each cache replacement operation directed to the right side of PLRU tree 1900, decision node 1 (1910) directs the cache replacement operation either to way 2 (1924) on its left, or to way 3 (1926) on its right, dependent on the state of a replacement indicator, such as an LRU value, associated with decision node 1 (1910).

FIG. 19B illustrates an asymmetric PLRU tree 1930 for an associative memory, such as a cache, that includes six ways. In this example, the minority side, which is on the right side of PLRU tree 1930, includes two ways, labeled as way 4 (1965) and way 5 (1966). In this example, the majority side of asymmetric PLRU tree 1930, which is on the left side of PLRU tree 1930, includes four ways, labeled as way 0 (1961), way 1 (1962), way 2 (1963), and way 3 (1964). In this example, the majority side is further subdivided into two subgroups of ways, each including two ways. As in the previous example, from the perspective of decision node 0 (1935), there is a 2:1 ratio between its two sub-trees, meaning the majority sub-tree and the minority sub-tree have available leaves in a 2:1 ratio. In one example embodiment, if the value of the replacement indicator is zero, the cache replacement operation may be directed to the left, and if the value of the replacement indicator is one, the cache replacement operation may be directed to the right. In the example illustrated in FIG. 19B, decision node 0 (1935) directs each cache replacement operation either to decision node 1 (1940) on the left side of PLRU tree 1930 or to decision node 4 (1955) the right side of PLRU tree 1930, dependent on the state of a replacement indicator, such as an LRU value, associated with decision node 0 (1935). For each cache replacement operation directed to the right side of PLRU tree 1930, decision node 4 (1955) directs the cache replacement operation either to way 4 (1965) on its left, or to way 5 (1965) on its right, dependent on the state of a replacement indicator, such as an LRU value, associated with decision node 4 (1955). For each cache replacement operation directed to decision node 1 (1940) the left side of PLRU tree 1930, decision node 1 (1940) directs the cache replacement operation either to decision node 2 (1945) on its left or to decision node 3 (1950) on its right, dependent on the state of a replacement indicator, such as an LRU value, associated with decision node 1 (1940). For each cache replacement operation directed to decision node 2 (1945), decision node 2 (1945) directs the cache replacement operation either to way 0 (1961) on its left, or to way 1 (1962) on its right, dependent on the state of a replacement indicator, such as an LRU value, associated with decision node 2 (1945). For each cache replacement operation directed to decision node 3 (1950), decision node 3 (1950) directs the cache replacement operation either to way 2 (1963) on its left, or to way 3 (1964) on its right, dependent on the state of a replacement indicator, such as an LRU value, associated with decision node 3 (1950).

The increasing use of Cache Quality of Service Enforcement (CQE) features introduces a new source of imbalanced PLRU trees. For example, CQE has been widely deployed in modern CPUs, especially those used in virtualized data centers. CQE can help prevent side channel attacks by isolating data caching of different threads into their own regions within a cache. In at least some embodiments, CQE can be used to implement a cache locking feature, which may improve determinism for embedded systems. This feature may also improve cache fairness in various classes of servers. CQE mechanisms typically operate by dynamically partitioning ways among the active classes of service according to way mask registers that are programmed by the managing software. This way partitioning can dynamically create the effect of a non-power-of-two associative memory structure, even if the underlying hardware structure includes a power-of-two number ways. In at least some embodiments of the present disclosure, cache replacement policies implemented using weighted PLRU trees, such as those described herein, may retain the advantages of binary tree based PLRU policies and may also dynamically adapt to the repartitioning of ways in systems that implement CQE features.

In one example embodiment, a private L1 cache may be attached to each core and an L2 cache may be shared between multiple cores. In this example, in order to avoid interference and collision issues that arise from crossing different cores, the shared L2 cache may be partitioned to isolate different portions of the cache. In at least some embodiments, this partitioning may be done according to its set associativity. For example, if the L2 cache includes eight ways, it might be partitioned such that two ways are allocated to a first core and six ways are allocated to a second core. In this example, a cache replacement policy using weighted PLRU trees may be applied to the second partition, which includes a number of ways that is not a power of two.

FIG. 19C illustrates an asymmetric PLRU tree 1970 for an associative memory, such as a cache, that includes 4 ways, and in which one of the ways, shown as way 0 (1992) is disabled by a Cache Quality of Service Enforcement (CQE) feature for a given thread, as described above. Therefore, way 0 (1992) is not eligible to service any cache replacement operations of the given thread that are directed to the associative memory and are serviced through the decision nodes of asymmetric PLRU tree 1970. In this example, the minority side, which is on the left side of PLRU tree 1970, includes only a single way, labeled as way 1 (1994), that is eligible to perform a cache replacement operation. In this example, the majority side of asymmetric PLRU tree 1970, which is on the right side of PLRU tree 1970, includes two ways, labeled as way 2 (1996) and way 3 (1998). As in the previous examples, from the perspective of node 0 (1975), there is a 2:1 ratio between its two sub-trees, meaning the majority sub-tree and the minority sub-tree have available leaves in a 2:1 ratio.

In this example, decision node 0 (1975) directs each cache replacement operation either to decision node 1 (1980) on the left side of PLRU tree 1970, or to decision node 2 (1985) on the right side of PLRU tree 1970, dependent on the state of a replacement indicator, such as an LRU value, associated with decision node 0 (1975). In one example embodiment, if the value of the replacement indicator is zero, the cache replacement operation may be directed to the left, and if the value of the replacement indicator is one, the cache replacement operation may be directed to the right. In the example illustrated in FIG. 19C, each cache replacement operation directed to decision node 1 (1980) is directed to way 1 (1994). In one embodiment, the state of a replacement indicator, such as an LRU value, associated with decision node 1 (1980) may be constant, at least as long as way 0 is ineligible to service cache replacement operations. For each cache replacement operation directed to decision node 2 (1985) on the right side of PLRU tree 1970, decision node 2 (1985) directs the cache replacement operation either to way 2 (1996) on its left, or to way 3 (1998) on its right, dependent on the state of a replacement indicator, such as an LRU value, associated with decision node 2 (1985).

Various techniques for implementing cache replacement using weighted PLRU trees are illustrated in FIGS. 20 to 26 and described in detail below, according to embodiments of the present disclosure. Several of these techniques are described in term of their application to an asymmetric PLRU tree in which one of the ways has been disabled or otherwise made ineligible to participate in cache replacement operations, such as PLRU tree 1970 illustrated in FIG. 19C. In other embodiments, these techniques may also be applied to an associative memory structure whose underlying hardware implements a non-power-of-two number of ways, such as a native thee-way cache, an example of which is illustrated in FIG. 19A. In still other embodiments, these techniques may be applied to associative memory structures that include larger numbers of ways, such as a six-way structure, a ten-way structure, or a twelve-way structure. In general, these techniques may be scalable for application to any associative memory structure or sub-structure that includes a non-power-of-two number of way using an asymmetric PLRU tree with weighting, as described herein.

Figure 20:
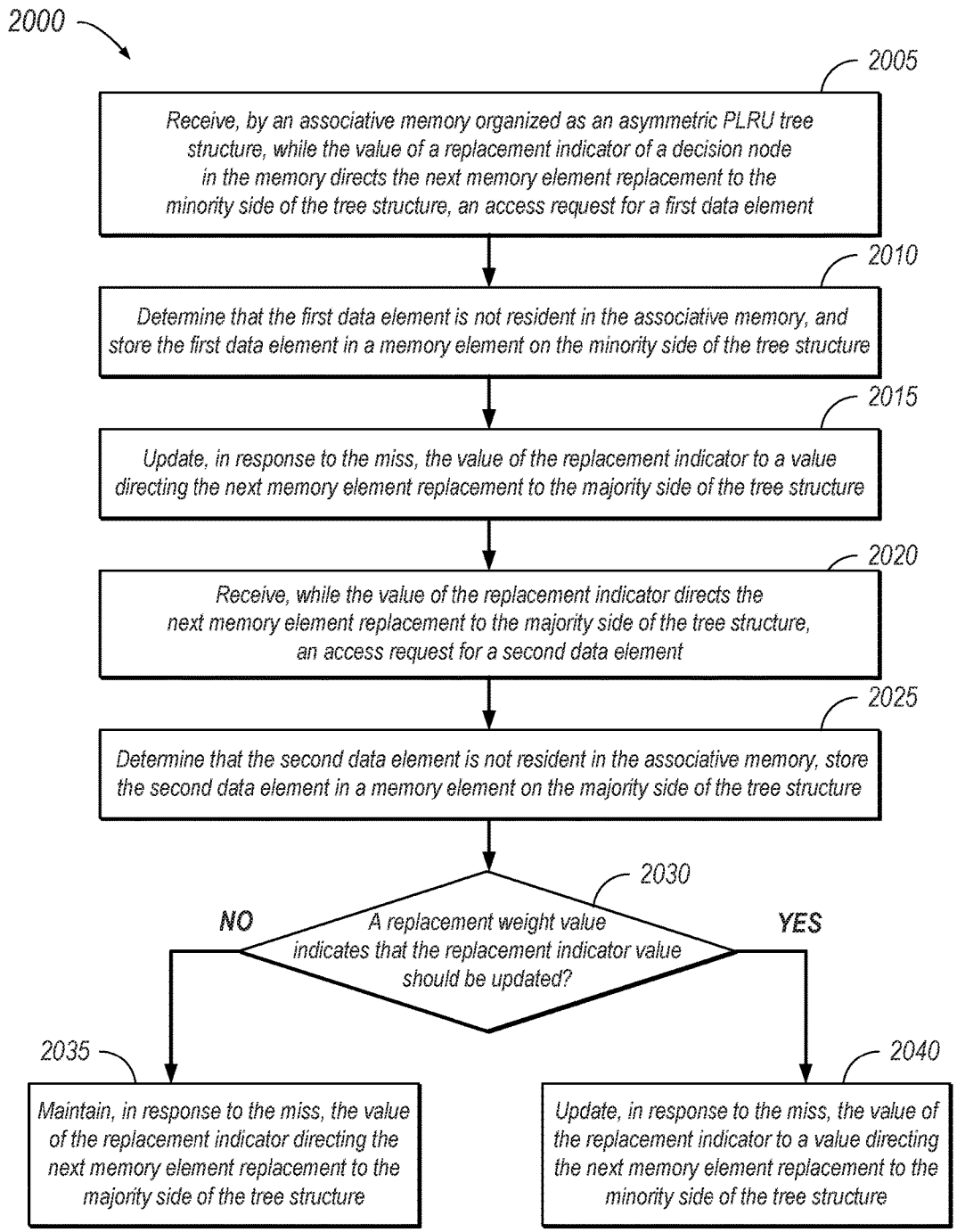
FIG. 20 is an illustration of an example method for implementing replacement in an associative memory using weighted PLRU trees, according to embodiments of the present disclosure.

FIG. 20 is an illustration of an example method 2000 for implementing replacement in an associative memory using weighted PLRU trees, according to embodiments of the present disclosure. Method 2000 may be implemented by any of the elements shown in FIGS. 1-19. Method 2000 may be initiated by any suitable criteria and may initiate operation at any suitable point. In one embodiment, method 2000 may initiate operation at 2005. Method 2000 may include greater or fewer operations than those illustrated. Moreover, method 2000 may execute its operations in an order different than those illustrated below. Method 2000 may terminate at any suitable operation. Moreover, method 2000 may repeat operation at any suitable operation. Method 2000 may perform any of its operations in parallel with other operations of method 2000, or in parallel with operations of other methods.

Furthermore, method 2000 may be executed multiple times to determine when and whether to update a replacement indicator in a decision node of an asymmetric PLRU tree during operation. Method 2000 may be executed over time to update or more such replacement indicators in response to executing instruction, in response to a change in the configuration of the associative memory, or based on other conditions. Based upon the results of method 2000, other methods may be invoked, such as method 2200 or method 2600 described below. These additional methods may be invoked during the execution of method 2000 to perform some of the operations of method 2000.

At 2005, in one embodiment, an associative memory organized as an asymmetric PLRU tree structure receives an access request for a first data element while the value of a replacement indicator of a decision node in the memory directs the next memory element replacement to the minority side of the tree structure. In one example, the associative memory may be a cache. In another example, the associative memory may be a translation lookaside buffer (TLB). At 2010, it is determined that the first data element is not resident in the associative memory, and the first data element is stored in a memory element of a way on the minority side of the asymmetric PLRU tree structure. At 2015, in response to the miss, the value of the replacement indicator is updated to a value directing the next memory element replacement to the majority side of the tree structure.

At 2020, while the value of the replacement indicator directs the next memory element replacement to the majority side of the tree structure, an access request for a second data element is received. At 2025, it is determined that the second data element is not resident in the associative memory, and the second data element is stored in a memory element of a way on the majority side of the asymmetric PLRU tree structure.

At 2035, if it is determined that a replacement weight value indicates that the replacement indicator value should be updated, method 2000 proceeds to 2040. Otherwise, method 2000 proceeds to 2035. At 2035, in response to the miss, the current value of the replacement indicator directing the next memory element replacement to the majority side of the tree structure is maintained. At 2040, in response to the miss, the value of the replacement indicator is updated to a value directing the next memory element replacement to the minority side of the tree structure.

In systems that implement a standard tree-based LRU policy, an LRU update sets the value of a replacement indicator for the corresponding decision node to point to the other sub-tree, indicating that the next potential replacement should be within that other sub-tree. This approach works well when the tree is a complete binary tree. However, in an asymmetric tree such as that illustrated in FIG. 19C, a way on the minority side, such as way 1 (1994), will become more vulnerable to victimization than the ways on the majority side due to the asymmetry.

Figure 21A:
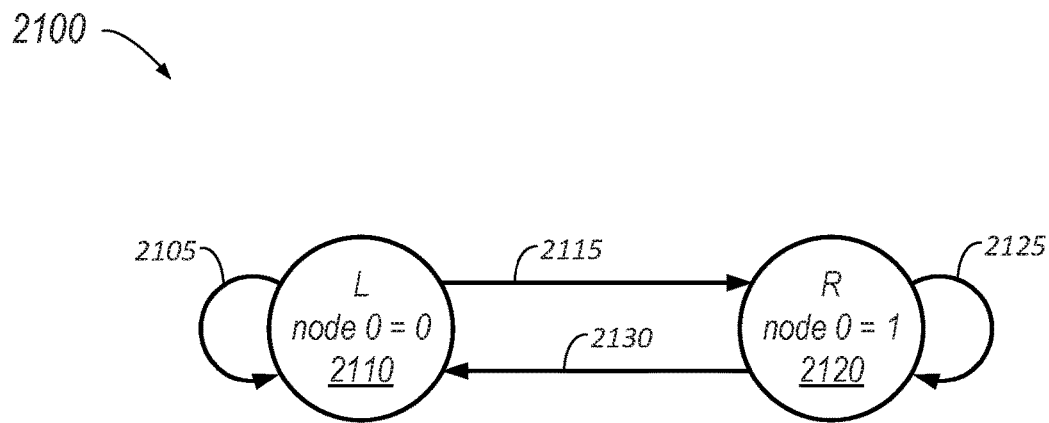
FIG. 21A illustrates the operation of a state machine for replacement in an associative memory with an asymmetric PLRU tree, according to embodiments of the present disclosure.

FIG. 21A illustrates the operation of a state machine 2100 for replacement in an associative memory with an asymmetric PLRU tree, according to embodiments of the present disclosure. In one embodiment, state machine 2100 controls cache line insertions and/or cache line evictions for a four-way cache in which one way is masked. The cache may be organized as shown in asymmetric PLRU 1970 illustrated in FIG. 19C. In this example, the state of a replacement indicator for a node 0, which may be a root node for the asymmetric PLRU tree, determines the sub-tree from which a victim of a cache replacement operation will be selected. For example, when the value of the replacement indicator for node 0, which may be an LRU value, is zero, the next victim may be selected from the left sub-tree, as in state 2110. When the value of the replacement indicator for node 0 is one, the next victim may be selected from the right sub-tree, as in state 2120.

In this example, the state transitions are defined as follows. Transition 2105 represents a transition to the 2110 state in response to a cache hit for a way on the right sub-tree as a result of an access request directed to the cache. Transition 2110 causes the value of the replacement indicator to be updated to zero, if it is not already zero, indicating that the next cache replacement victim is to be selected from the left sub-tree. Transition 2125 represents a transition to the 2120 state in response to a cache hit for a way on the left sub-tree as a result of an access request directed to the cache. Transition 2125 causes the value of the replacement indicator to be updated to one, if it is not already one, indicating that the next cache replacement victim is to be selected from the right sub-tree.

Transition 2115 represents a transition from state 2110 to state 2120 in response to a victim being selected from the left sub-tree. Transition 2115 causes the value of the replacement indicator to be updated from zero to one, indicating that the next cache replacement victim is to be selected from the right sub-tree. Transition 2130 represents a transition from state 2120 to state 2110 in response to a victim being selected from the right sub-tree. Transition 2130 causes the value of the replacement indicator to be updated from one to zero, indicating that the next cache replacement victim is to be selected from the left sub-tree.

In at least some embodiments, the cache replacement mechanisms that use weighted PLRU trees may assign different thresholds, or weights, to the transitions of the replacement indicator value for a decision node, such as node 0. In some embodiments, when the minority sub-tree is picked as a victim or is hit, the replacement indicator in the decision node will be updated to point to the majority side, as in a baseline PLRU approach. However, when the majority sub-tree is picked as a victim or is hit, the replacement indicator in the decision node might or might not be updated to point to the minority side, depending on the weight computation. The exact weights used for transition decisions may be dependent on the specific associativity and way masking that is current in effect for the associative memory. In some embodiments, a counter-based weight evaluation may be employed. In other embodiments, the counters may be replaced with a pseudo random number generator. The use of a pseudo random number generator for generating weights may, in some embodiments, enable cache replacement policies that are more flexible and that have a lower cost than counter-based embodiments.

In some embodiments, there may be a counter associated with each set. In such embodiments, a judgment about how often to transition from pointing to one sub-tree for the next cache replacement operation to pointing to the other sub-tree may be dependent on how imbalanced the two sub-trees below a decision node are. Since the number of ways that are eligible to service cache replacement operations in the two directions are not symmetrical, the weighting applied to the transition decision may be selected to compensate for the specific ratio between the numbers of eligible ways on the majority and minority sides. In at least some embodiments of the present disclosure, the weighted PLRU tree structures may be similar to existing tree-based PLRU storage, but the PLRU storage may be augmented with one or more counters, W, representing a current replacement weight value.

The value of such a counter may be used to influence the update of the replacement indicator of a decision node, as described herein.

Figure 21B:
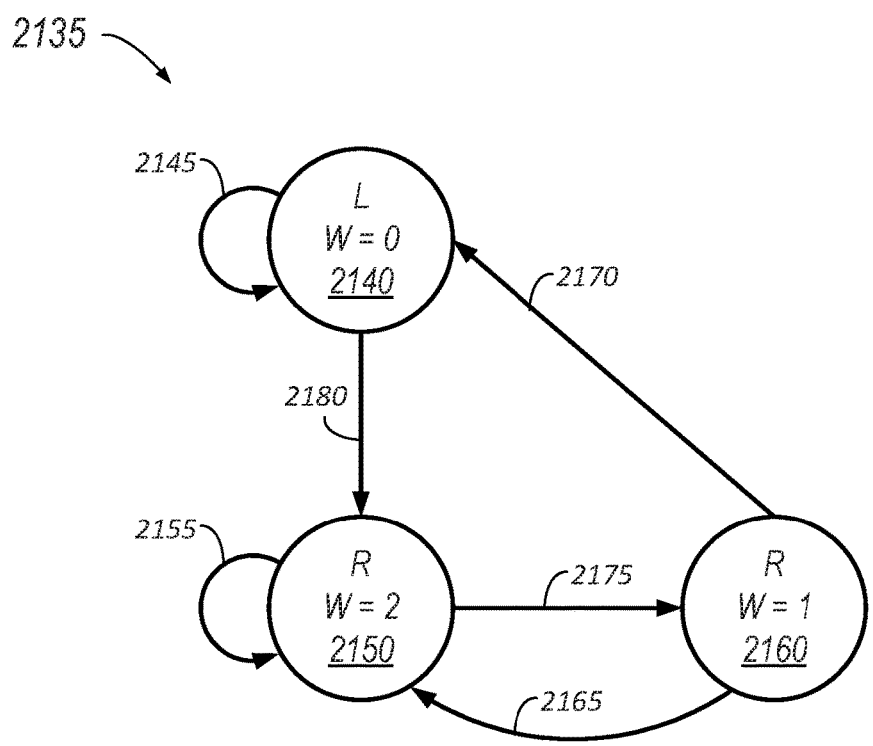
FIG. 21B illustrates the operation of a state machine for replacement in an associative memory using a weighted PLRU tree in which the weighting is based on a counter, according to embodiments of the present disclosure.

FIG. 21B illustrates the operation of a state machine 2135 for replacement in an associative memory using a weighted PLRU tree in which the weighting is based on a counter, according to embodiments of the present disclosure. In one embodiment, state machine 2135 controls cache line insertions and/or cache line evictions for a four-way cache in which one way is masked. The cache may be organized as shown in asymmetric PLRU 1970 illustrated in FIG. 19C. In the example embodiment illustrated in FIG. 21B, a weight, W, is added to the cache replacement mechanism to re-balance the asymmetric sub-trees. In this example, the weight is implemented using a counter and is entry-based. The weight ratio is 2:1, in this example. Thus, the victim of a cache line replacement operation will be selected from the right sub-tree when W is either 2 or 1, and will be selected from the left sub-tree when W is 0.

In the example illustrated in FIG. 21B, the state of a replacement indicator representing the value of a counter W for a node 0, which may be a root node for the asymmetric PLRU tree, determines the sub-tree from which a victim of a cache replacement operation will be selected. For example, when the value of the counter W is zero, the next victim may be selected from the left sub-tree, as in state 2140. When the value of the counter W is one, the next victim may be selected from the right sub-tree, as in state 2160. Similarly, when the value of the counter W is two, the next victim may be selected from the right sub-tree, as in state 2150.

In this example, the state transitions are defined as follows. Transition 2145 represents a transition to the 2140 state in response to a cache hit for a way on the right sub-tree as a result of an access request directed to the cache. Transition 2145 causes the value of the counter W to be updated to zero, if it is not already zero, indicating that the next cache replacement victim is to be selected from the left sub-tree. Transition 2155 represents a transition to the 2150 state in response to a cache hit for a way on the left sub-tree as a result of an access request directed to the cache. Transition 2155 causes the value of the counter W to be updated to two, if it is not already two, indicating that at least the next two cache replacement victims are to be selected from the right sub-tree.

Transition 2180 represents a transition from state 2140 to state 2150 in response to a victim being selected from the left sub-tree. Transition 2180 causes the value of the counter W to be updated from zero to two, indicating that at least the next two cache replacement victims are to be selected from the right sub-tree. Transition 2175 represents a transition from state 2150 to state 2160 in response to a cache hit for a way on the right sub-tree as a result of an access request directed to the cache or a victim being selected from the right sub-tree. Transition 2175 causes the value of the counter W to be updated from two to one, indicating that the next cache replacement victim is to be selected from the right sub-tree.

Transition 2165 represents a transition from state 2160 to state 2150 in response to a cache hit for a way on the left sub-tree as a result of an access request directed to the cache. Transition 2165 causes the value of the counter W to be updated from one to two, indicating that at least the next two cache replacement victims are to be selected from the right sub-tree. Transition 2170 represents a transition from state 2160 to state 2140 in response to a cache hit for a way on the right sub-tree as a result of an access request directed to the cache or a victim being selected from the right sub-tree.

Transition 2170 causes the value of the counter W to be updated from one to zero, indicating that the next cache replacement victim is to be selected from the left sub-tree.

Figure 22:
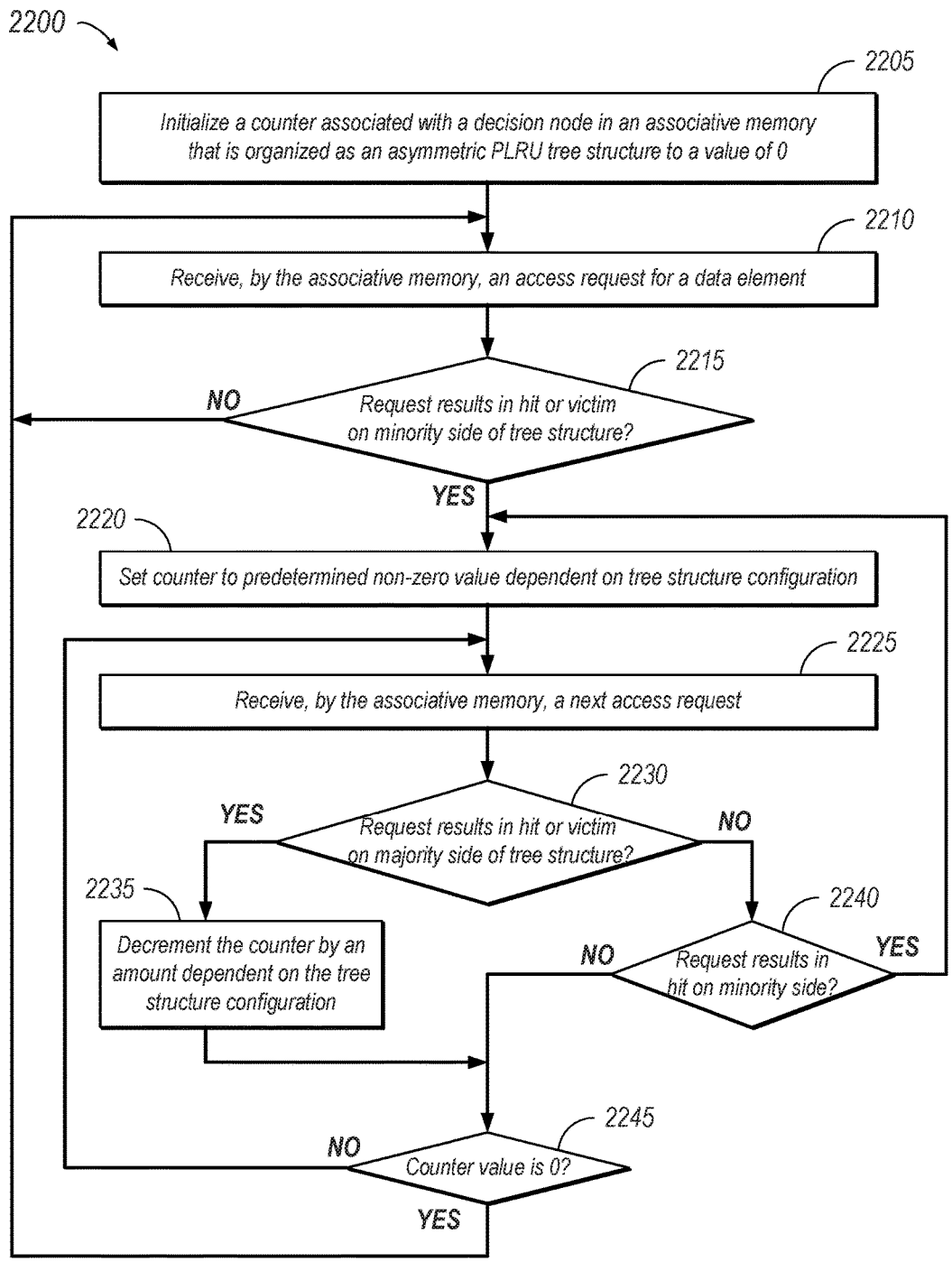
FIG. 22 is an illustration of an example method for implementing replacement in an associative memory using a weighted PLRU tree in which the weighting is based on a counter, according to embodiments of the present disclosure.

FIG. 22 is an illustration of an example method 2200 for implementing replacement in an associative memory using a weighted PLRU tree in which the weighting is based on a counter, according to embodiments of the present disclosure. Method 2200 may be implemented by any of the elements shown in FIGS. 1-21. Method 2200 may be initiated by any suitable criteria and may initiate operation at any suitable point. In one embodiment, method 2200 may initiate operation at 2205. Method 2200 may include greater or fewer operations than those illustrated. Moreover, method 2200 may execute its operations in an order different than those illustrated below. Method 2200 may terminate at any suitable operation. Moreover, method 2200 may repeat operation at any suitable operation. Method 2200 may perform any of its operations in parallel with other operations of method 2200, or in parallel with operations of other methods.

Furthermore, method 2200 may be executed multiple times to determine when and whether to update a replacement indicator in a decision node of an asymmetric PLRU tree during operation. Method 2200 may be executed over time to update one or more such replacement indicators in response to executing instruction, in response to a change in the configuration of the associative memory, or based on other conditions. Based upon the results of method 2200, other methods may be invoked. In some embodiments, method 2200 may be invoked during the execution of method 2000 to perform some of the operations of method 2000.

At 2205, in one embodiment, a counter associated with a decision node in an associative memory that is organized as an asymmetric PLRU tree structure may be initialized to a value of zero. In one embodiment, a counter value of zero represents a replacement weight value that causes a replacement indicator to point to the minority side of the asymmetric PLRU tree structure for next the replacement operation. At 2210, an access request for a data element is received by the associative memory. At 2215, if the request results in a hit or a victim on the minority side of tree structure, method 2200 proceeds to 2220. Otherwise, method 2200 returns to 2210 without making a change to the counter value or replacement indicator. At 2220, the value of the counter is incremented or set to a predetermined non-zero value dependent on specific configuration of the asymmetric PLRU tree structure. For example, in an embodiment in which there is a 2:1 ratio between available ways on the majority side and the available ways on the minority side, the value of the counter may be incremented by or set to a value of two.

At 2225, a next access request is received by the associative memory. At 2230, if the request results in hit or a victim on majority side of the asymmetric PLRU tree structure, method 2200 proceeds to 2235. Otherwise, method 2200 proceeds to 2240. At 2235, the value of the counter is decremented by an amount that is dependent on the specific configuration of the asymmetric PLRU tree structure, after which method 2200 proceeds to 2245. At 2240, if the request results in a hit on the minority side of the asymmetric PLRU tree structure, method 2200 returns to 2220 without making a change to the counter value of replacement indicator. Otherwise, method 2200 proceeds to 2245. At 2245, if the counter value is 0, method 2200 returns to 2210, after which any or all of the operations shown as 2210 to 2245 may be repeated one or more times, as appropriate. Otherwise, method 2200 returns to 2225, after which any or all of the operations shown as 2225 to 2245 may be repeated one or more times, as appropriate.

Method 2200 may continue to repeat during operation and to implement replacement in the associative memory using the counter to control the replacement of entries on the majority and minority sides of the PLRU tree. While in example method 2200, the counter is initialized to a value of zero, in another embodiment, the counter may be initialized to a pre-determined non-zero value, such that the replacement indicator initially points to the majority side for the next replacement operation.

While several example embodiments described herein assume the application of cache replacement policies using weighted PLRU trees only at the root node, in other embodiments, these techniques may be applied at any level, or at multiple levels, in a PLRU tree for an associative memory in order to compensate for asymmetry. In some embodiments of the present disclosure, there may be a counter at every decision node below which there might be an imbalance between the left and right sub-trees.

In some embodiments, the counter-based approach to implementing weighted PLRU trees described herein may not scale well due to the need for multiple counters. Furthermore, supporting arbitrary way masking configurations would require a unique W counter per set for every node in the tree with imbalanced sub-trees. In some embodiments, the scalability shortcomings of counter-based weighted PLRU trees may be addressed by sharing W counters between sets, or by supporting only a subset of masking possibilities. For example, with an associative memory structure that includes 64 sets, a single W counter may be shared between every four sets. Sharing counters in this manner may reduce the cost of this approach, but affect performance and implementation cost due to the need to account for any imbalances that happen across two sub-trees whose decision nodes share a counter. In an embodiment in which the possible configurations of the masking for CQE are restricted, the kinds of imbalances that can be created may be limited to a subset of the nodes of the tree. In this case, there may be no need to include counters for all of the nodes. For example, if, for an eight-way cache, the masking options are restricted to allow only two possibilities, either allocating all eight ways to a single partition or partitioning the ways into a first sub-tree with two ways and a second sub-tree with six ways, the first sub-tree would not have any imbalances to deal with, and only some of the decision nodes for the second partition would need to include a W counter. In another example, for a seven-way associative memory, the imbalance is not just limited to the root node, but must also be handled by decision nodes in some sub-tree, as well.

At least some embodiments of the present disclosure implement cache replacement with weighted PLRU trees using probabilistic weighting to control state transitions. For example, an approach that is based on a pseudo random number generator (PRNG) may control the state transition probability according to probabilistic weights derived from the way configuration of the associative memory. In some embodiments, a PRNG based approach may be adaptable in response to repartitioning of the set associativity of the memory (e.g., due to CQE). For example, in embodiments in which the set associativity can be partitioned in a dynamic way, the PRNG based approach may always derive the probabilistic weights to be used to determine state transitions based on the current runtime configuration, thus compensating for any imbalanced sub-trees even as they change.

In at least some embodiments, the per-set replacement weights of the W counters described above may be replaced by probabilistic weights implemented as pseudo random numbers. In some embodiments, a single PRNG (such as a PRNG implemented using an Linear Feedback Shift Register) may be used to generate the current replacement weight value, replacing all of the W counters of the counter-based approach. Statistically speaking, transitions within an imbalanced tree will be corrected as with the W counters, given enough cycles. Performance experiments have confirmed that the performance of the PRNG based approach is similar to that of the counter-based approach.

Figure 23:
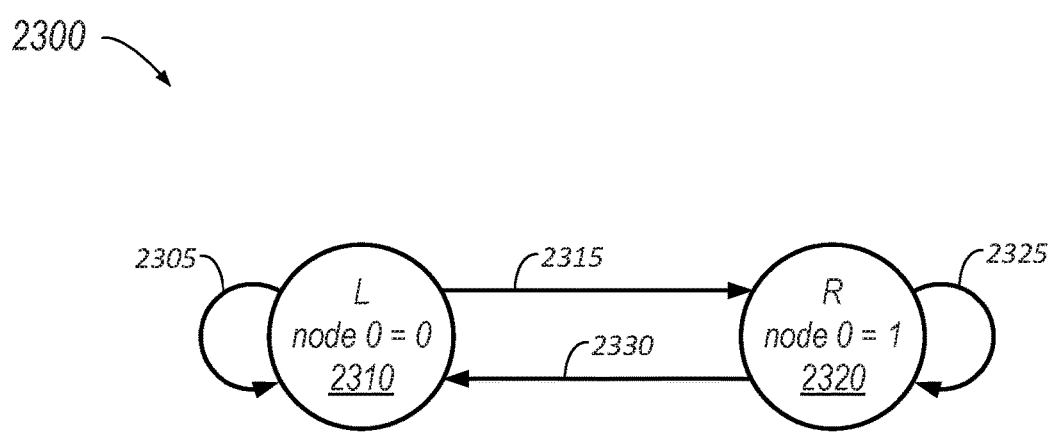
FIG. 23 illustrates the operation of a state machine for replacement in an associative memory using a weighted PLRU tree in which the weighting is a probabilistic weighting based on a pseudo random number, according to embodiments of the present disclosure.

FIG. 23 illustrates the operation of a state machine 2300 for replacement in an associative memory, such as a cache, using a weighted PLRU tree in which the weighting is a probabilistic weighting based on a pseudo random number, according to embodiments of the present disclosure. In one embodiment, state machine 2300 controls cache line insertions and/or cache line evictions for a four-way cache in which one way is masked. The cache may be organized as shown in asymmetric PLRU 1970 illustrated in FIG. 19C.

In the example embodiment illustrated in FIG. 23, the state of a replacement indicator for a node 0, which may be a root node for the asymmetric PLRU tree, determines the sub-tree from which a victim of a cache replacement operation will be selected. For example, when the value of the replacement indicator for node 0, which may be an LRU value, is zero, the next victim may be selected from the left sub-tree, as in state 2310. When the value of the replacement indicator for node 0 is one, the next victim may be selected from the right sub-tree, as in state 2320.

In this example, the state transitions are defined as follows. Transition 2305 represents a transition to the 2310 state in response to a cache hit for a way on the right sub-tree as a result of an access request directed to the associative memory. Transition 2305 causes the value of the replacement indicator to be updated to zero, if it is not already zero, indicating that the next cache replacement victim is to be selected from the left sub-tree. Transition 2325 represents a transition to the 2320 state in response to a cache hit for a way on the left sub-tree as a result of an access request directed to the associative memory. Transition 2325 causes the value of the replacement indicator to be updated to one, if it is not already one, indicating that the next cache replacement victim is to be selected from the right sub-tree.

Transition 2315 represents a transition from state 2310 to state 2320 in response to a victim being selected from the left sub-tree. Transition 2315 causes the value of the replacement indicator to be updated from zero to one, indicating that the next cache replacement victim is to be selected from the right sub-tree. Transition 2330 represents a transition from state 2320 to state 2310 in response to determining that a victim was selected from the right sub-tree and that the value of a pseudo random number generated by circuitry within a cache replacement control unit is below a threshold value defined for this transition. Transition 2330 causes the value of the replacement indicator to be updated from one to zero, indicating that the next cache replacement victim is to be selected from the left sub-tree.

Figure 24:
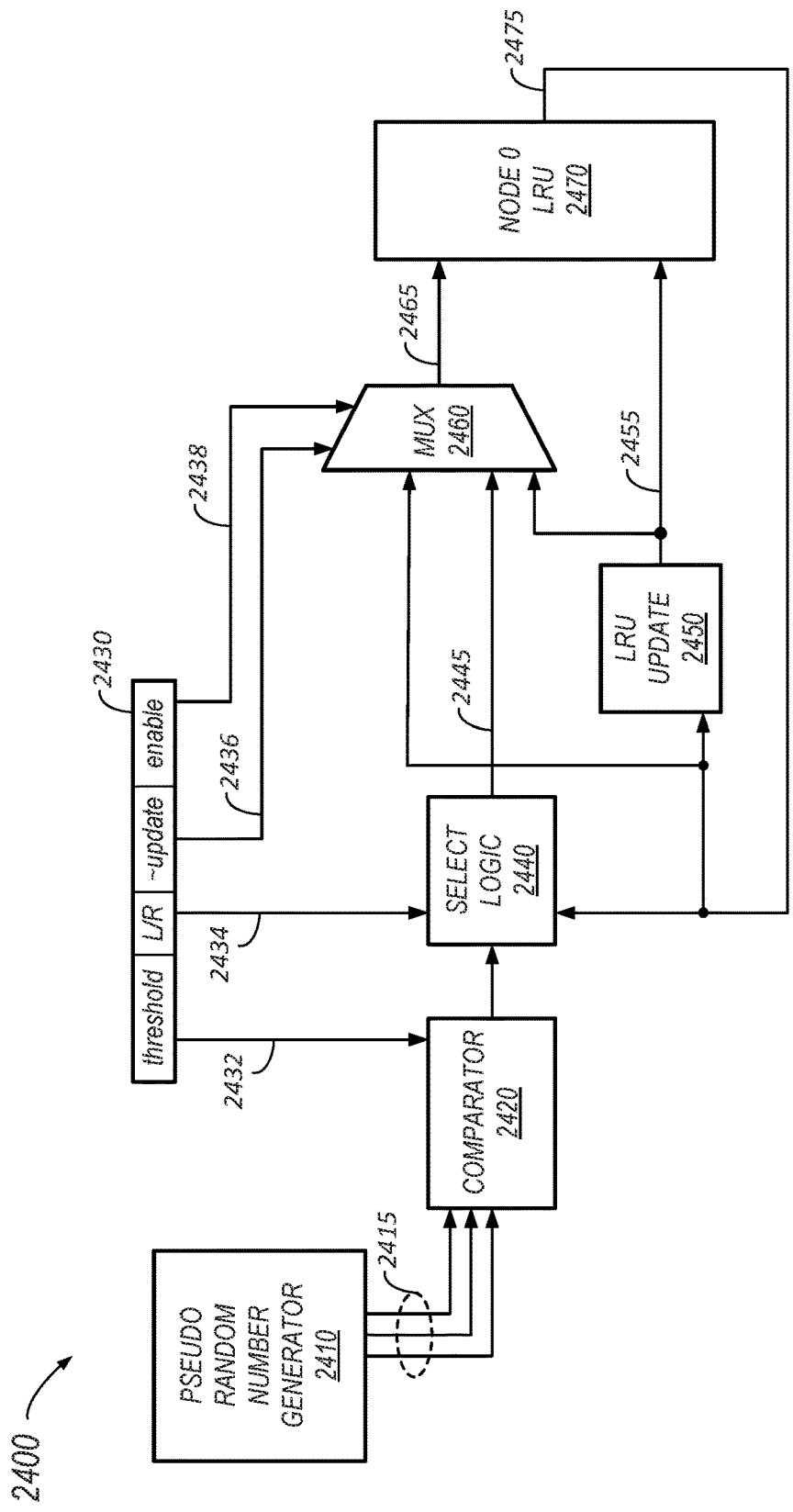
FIG. 24 is a block diagram illustrating a portion of an example associative memory subsystem to implement replacement using a weighted PLRU tree in which the weighting is a probabilistic weighting based on a pseudo random number, according to embodiments of the present disclosure.

In some embodiments, different functions of the LFSR (effectively, different PRNG outputs) may extend the PRNG-based cache replacement approach to arbitrary way mask configurations such that multiple nodes having imbalanced sub-trees can be processed in parallel. FIG. 24 is a block diagram illustrating a portion of an example associative memory subsystem 2400 to implement replacement using a weighted PLRU tree in which the weighting is a probabilistic weighting based on a pseudo random number, according to embodiments of the present disclosure. In this example embodiment, the PRNG is implemented by a Linear Feedback Shift Register (LFSR), and the LRU transition is conditionally overridden based on the probabilistic weight computation.

In this example embodiment, associative memory subsystem 2400 may include a replacement control unit, in some embodiments. In embodiments in which the associative memory is a cache, the portion of associative memory subsystem 2400 depicted in FIG. 24 may be implemented within a cache controller. In the example embodiment illustrated in FIG. 24, associative memory subsystem 2400 includes a pseudo random number generator 2410, a comparator 2420, a set of control values 2430 for controlling cache replacement operations using a weighted PLRU tree, select logic 2440, an LRU update element 2450, a mux 2460, and storage for an LRU value for a node 0, shown as node 0 LRU 2470.

In this example, controls 2430 includes four fields that are specific to the configuration of the weighted PLRU tree for the associative memory, each of which is defined in more detail below. The four fields include a threshold value, a left/right (L/R) indicator, an update indicator, and an enable field. Pseudo random number generator 2410 may include any suitable hardware circuitry or logic to implement pseudo random number generation. In at least some embodiments, pseudo random number generator 2410 may be implemented using a Linear Feedback Shift Register (LFSR). In this example, multiple bits may be pulled out of the LFSR and provided as inputs to comparator 2420. In the example illustrated in FIG. 24, three bits representing a pseudo random number, shown as 2415, are provided to comparator 2420. These three bits may include the lowest order three bits of the LFSR, the highest order three bits of the LFSR, or another predefined subset of the bits of the LFSR, in different embodiments. In this example embodiment, comparator 2420 may include hardware circuitry or logic to compare pseudo random number 2415 to the threshold value 2432 in controls 2430. The output of the comparator, whose value indicates whether or not pseudo random number 2415 is less than the threshold value 2432, in provided as an input to select logic 2440. In this way, comparator 2420 may derive a probability that the replacement indicator for node 0 should be updated to point to the minority side of the PLRU tree. The derived probability may be applied while the current LRU value points to the majority side of the PLRU tree when deciding whether or not to transition the LRU value to point to the minority side of the PLRU tree.

Other inputs to select logic 2440 include left/right (L/R) indicator 2434 and the current replacement indicator value of node 0, shown as 2475. Select logic 2440 may include hardware circuitry or logic to determine whether or not the probabilistic weighting provided by the pseudo random number generator 2410 is sufficient to influence or override the decision about whether or not to transition the LRU value to point to the minority side of the PLRU tree. The output of select logic 2440, shown as 2445, may represent an override recommendation, based on the probabilistic weighting, and may be provided as an input to mux 2460. Other inputs to mux 2460 include update indicator 2436, enable field 2438, node 0 LRU value 2475, and updated node 0 value 2455.

In this example embodiment, the left/right (L/R) indicator 2434 identifies the majority side of the PLRU tree from the perspective of node 0 and its LRU value, where a value representing the left side is aligned towards way 0. In this example embodiment, the update indicator 2436, when asserted, indicates that, due to masking, the minority side is not eligible to service cache replacement operations. In this example embodiment, the enable field 2438, when asserted, enables the application of probabilistic weighting to the baseline cache replacement mechanisms implemented for the associative memory. For example, a bit in this field may be set when, from the perspective of node 0, the two sub-trees of the PLRU tree are asymmetric. In at least some embodiments, if the configuration of the associative memory is subsequently repartitioned such that the sub-trees of the corresponding PLRU tree become symmetric, a bit in this field may be cleared in order to disable this feature. In at least some embodiments, the enable field 2430 is used together with the update field 2436 to decide whether or not probabilistic weighting should be applied when determining transitions from the majority side to the minority side for node 0 LRU value 2470.

In the example embodiment illustrated in FIG. 24, LRU update element 2450 includes hardware circuitry or logic to update the value of the replacement indicator node 0, which is provided to LRU update element 2450 as node 0 LRU value 2475, to produce updated node 0 LRU value 2455. Both the node 0 LRU value 2475 and the updated node 0 LRU value 2455 are provided as inputs to mux 2460. In this example embodiment, mux 2460 is controlled by the value of update indicator 2436 and enable field 2438. If the values of these two inputs collectively indicate that probabilistic weighting should not be applied when determining transitions from the majority side to the minority side for node 0 LRU value 2470, then the override recommendation 2445 based on probabilistic weighting will not be considered when determining transitions from the majority side to the minority side for node 0 LRU value 2470. Instead, the determination may be made according to a baseline PLRU approach. In this example, the output of mux 2460, shown as output 2465, may ultimately control whether or not the node 0 LRU value 2470 is flipped from pointing to the majority side to pointing to the minority side based on probabilistic weighting.

While this example embodiment assumes that cache replacement using PNRG-based weighted PLRU trees is applied only to the root node, in other embodiments, this approach may be extended to any LRU nodes. The area and implementation cost of this approach, including the LFSR, configuration and controls, muxing logic, and other logic, may be relatively low when compared to other approaches for dealing with asymmetric PLRU trees.

Figure 25A:
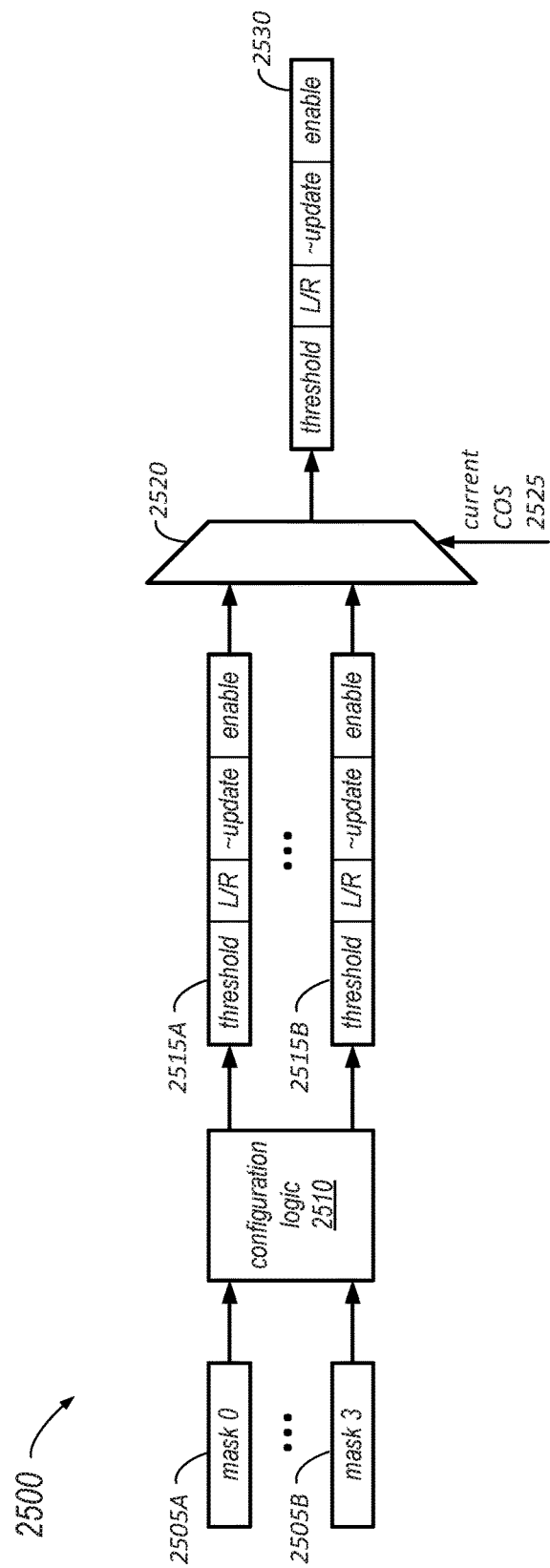
FIG. 25A is a block diagram illustrating a portion of an example associative memory subsystem to generate controls for replacement using a weighted PLRU tree based on the configuration of the PLRU tree, according to embodiments of the present disclosure.

In at least some embodiments, the controls depicted as 2430 in FIG. 24 may be specific to the configuration of the weighted PLRU tree for the associative memory. In some embodiments, the configuration of the weighted PLRU tree may be dynamically modified during operation in accordance with programmable way masks that are associated with different classes of service. In some embodiments, respective collections of control values may be derived from each of multiple way masks supported in the system. In some embodiments, a replacement control unit, such as any of those described herein, may include hardware circuitry or logic to interpret these way masks and to generate corresponding collections of controls. FIG. 25A is a block diagram illustrating a portion of an example associative memory subsystem 2500 to generate controls for replacement using a weighted PLRU tree based on the configuration of the PLRU tree, according to embodiments of the present disclosure. In the example embodiment illustrated in FIG. 25A, way masks 0 to 3, shown as 2505A-2505B, are input to configuration logic 2510. Each of these way masks may define the partitioning of the available ways under a different class of service. Configuration logic 2510 includes hardware circuitry or logic to generate, based on each way mask 2505, a corresponding collection of controls, shown as controls 2515A-2515B. For example, each set of controls 2414 may include a threshold value, a left/right (L/R) indicator, an update indicator, and an enable field that are derived based on the information in the corresponding way mask.

In at least some embodiments, a class-of-service (COS) indicator may be included in requests to access the associative memory, and the current value of this indicator may be used to select one of the sets of controls 2515 for use. For example, the current class-of-service indicator may identify a partitioning scheme in which one or more ways are excluded from participation in replacement operations, as defined by one of masks 2505, and the corresponding controls 2515 may enforce that partitioning while balancing cache replacement operations directed to the remaining ways. In the example embodiment illustrated in FIG. 25A, the currently available collections of controls 2515 are input to mux 2520, and the current class-of-service (COS) indicator 2525 selects one of the sets of controls 2515 to be applied when making transition decisions for the replacement indicator of node 0. In one embodiment, the output of mux 2520, shown as controls 2530 in FIG. 25A, may be provided to associative memory subsystem 2400 illustrated in FIG. 24 as controls 2430. In at least some embodiments, any time that software programs the masks, the configuration change will be immediately reflected in the controls.

In at least some embodiments, the way masks 2505 illustrated in FIG. 25A may define the allocation of particular ways to particular processor cores or threads. In other embodiments, way masks 2505 may define the allocation of particular ways to particular request types. In some embodiments, dependent on the CQE mechanisms implemented in the system, the system may support one way mask per core or per thread. In other embodiments, the system may support one way mask per structure, such as per PLRU structure. In general, the systems described herein may include some method within the architecture to indicate, for a particular associative memory structure, that some number of ways is devoted to one caching agent, and another number of ways is devoted to another caching agent. In embodiments in which a mask is programmed for a particular structure, the particular configuration programmed in the mask may be defined by a specific mask identifier. In some embodiments, all of the masks for all of the structures that participate in a common configuration may be associated with the same mask identifier. In some embodiments, an associative memory may be partitioned based on the different request types that are supported in the system. In such embodiments, different masks may be used for each fill request or for each access to the associative memory. In these and other embodiments, the structure may be repartitioned at runtime for any reason, based on its associativity. In general, for any given access to one of these structures, there may be a predetermined number of ways to influence state transitions for cache replacement.

Figure 25B:
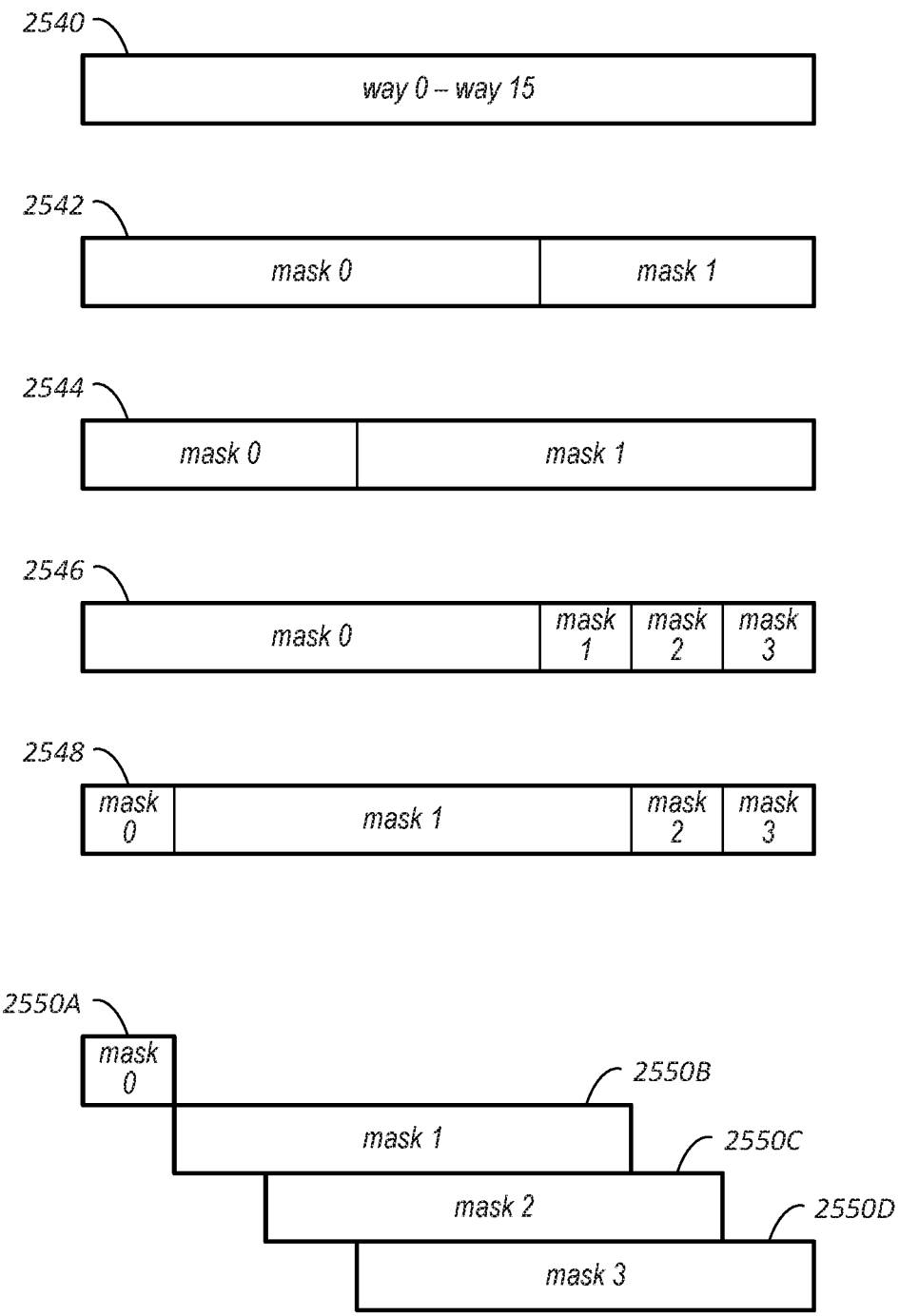
FIG. 25B illustrates example masks from which respective asymmetric PLRU trees are to be generated, according to embodiments of the present disclosure.

FIG. 25B illustrates example masks from which respective asymmetric PLRU trees that use probabilistic weighting, and controls therefore, are to be generated, according to embodiments of the present disclosure. In these examples, it is assumed that the associative memory itself implements sixteen ways, as shown in mask 2540, which does not define any partitioning. In each of the remaining examples, there are two or four "agents", such as four cores or threads, that access the associative memory according to the partitioning defined by the way mask. Mask 2542 defines a partitioning in which the first ten ways are allocated to a first agent, agent 0, and the remaining six ways are allocated to a second agent, agent 1. In this example, neither partition includes a number of ways that is a power of two. Therefore, the controls corresponding to mask 2542 may enable cache replacement using weighted PLRU trees, as described herein, in all cases. Mask 2544 defines a partitioning in which the first six ways are allocated to a first agent, agent 0, and the remaining ten ways are allocated to a second agent, agent 1. In this example, neither partition includes a number of ways that is a power of two. Therefore, the controls corresponding to mask 2544 may enable cache replacement using weighted PLRU trees, as described herein, in all cases.

Mask 2546 defines a partitioning in which the first ten ways are allocated to a first agent, agent 0, and the remaining six ways are allocated in respective pairs to a second agent (agent 1), a third agent (agent 2) and a fourth agent (agent 3). In this example, the second, third, and fourth partitions include two ways, while the first partition includes a number of ways that is a not power of two. Therefore, the corresponding controls for mask 2546 may enable cache replacement using weighted PLRU trees, as described herein, only for accesses directed to the first partition.

Mask 2548 defines a partitioning in which ways 2-11 are allocated to a second agent, agent 1, and the remaining six ways are allocated in respective pairs to a first agent (agent 0), a third agent (agent 2) and a fourth agent (agent 3). In this example, the first, third, and fourth partitions include two ways, while the second partition includes a number of ways that is a not power of two. Therefore, the corresponding controls for mask 2548 may enable cache replacement using weighted PLRU trees, as described herein, only for accesses directed to second partition.

In the last illustrated in FIG. 25B, a collection of way masks 2550 define a partitioning of the sixteen ways of the associative memory in which some of the partitions are overlapping. Specifically, mask portion 2550A illustrates that the first two ways (way 0 and way 1) are allocated exclusively for the use of a first agent (agent 0). Mask portion 2550B illustrates that a second agent (agent 1) can access any of ways 2-11, although only ways 2 and 3 are allocated exclusively for the use of agent 1. Similarly, mask portion 2550C illustrates that a third agent (agent 2) can access any of ways 4-13, although only ways 4 and 5 are allocated exclusively for the use of agent 2. Finally, mask portion 2550D illustrates that a fourth agent (agent 3) can access any of ways 6-15, although only ways 6 and 7 are allocated exclusively for the use of agent 1. In this example, the corresponding controls for masks 2550 may enable cache replacement using weighted PLRU trees, as described herein, for any accesses directed to any of the ways included in the second, third, and fourth partitions, i.e., any of ways 2-15.

Figure 26:
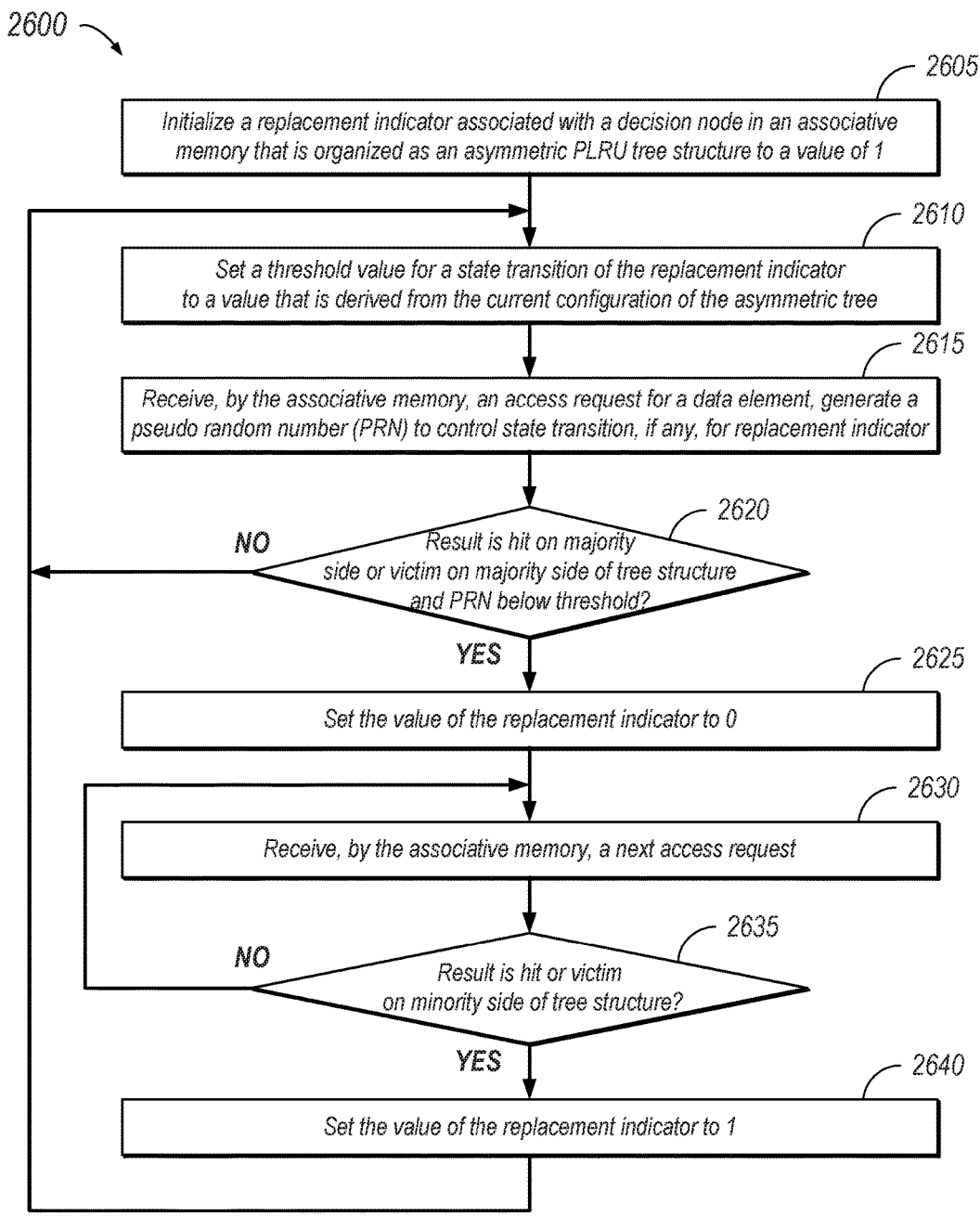
FIG. 26 is an illustration of an example method for implementing replacement in an associative memory using a weighted PLRU tree in which the weighting is a probabilistic weighting based on a pseudo random number, according to embodiments of the present disclosure.

FIG. 26 is an illustration of an example method for implementing replacement in an associative memory using a weighted PLRU tree in which the weighting is a probabilistic weighting based on a pseudo random number, according to embodiments of the present disclosure. Method 2600 may be implemented by any of the elements shown in FIGS. 1-25. Method 2600 may be initiated by any suitable criteria and may initiate operation at any suitable point. In one embodiment, method 2600 may initiate operation at 2605. Method 2600 may include greater or fewer operations than those illustrated. Moreover, method 2600 may execute its operations in an order different than those illustrated below. Method 2600 may terminate at any suitable operation. Moreover, method 2600 may repeat operation at any suitable operation. Method 2600 may perform any of its operations in parallel with other operations of method 2600, or in parallel with operations of other methods.

Furthermore, method 2600 may be executed multiple times to determine when and whether to update a replacement indicator in a decision node of an asymmetric PLRU tree during operation. Method 2600 may be executed over time to update one or more such replacement indicators in response to executing instructions, in response to a change in the configuration of the associative memory, or based on other conditions. Based upon the results of method 2600, other methods may be invoked. In some embodiments, method 2600 may be invoked during the execution of method 2000 to perform some of the operations of method 2000.

At 2605, in one embodiment, a replacement indicator associated with a decision node in an associative memory that is organized as an asymmetric PLRU tree structure may be initialized to a value of one. In some embodiments, a replacement indicator value of one points to the majority side of the asymmetric PLRU tree structure for next the replacement operation. At 2610, a threshold value for a state transition of the replacement indicator is set to a value that is derived from the current configuration of the asymmetric tree. At 2615, an access request for a data element is received by the associative memory, and a pseudo random number is generated to control a potential state transition, if any, for the replacement indicator.

At 2620, if the result of the request is a hit on the majority side of the asymmetric PLRU tree structure, or if there was a miss on the majority side leading to a victim on the majority side of the asymmetric PLRU tree structure and the pseudo random number that was generated is below the threshold value for the transition, method 2600 proceeds to 2625. Otherwise, method 2600 returns to 2610 without changing the value of the replacement indicator. At 2625, the value of the replacement indicator is set to zero.

At 2630, a next access request is received by the associative memory. At 2635, if the result of the request is a hit on the minority side of the asymmetric PLRU tree structure, or if there was a miss on the minority side leading to a victim on the minority side of the asymmetric PLRU tree structure, method 2600 proceeds to 2640. Otherwise, method 2600 returns to 2630 without updating the replacement indicator value, after which any or all of the operations shown as 2630 to 2640 may be repeated one or more times, as appropriate. At 2640, the value of the replacement indicator is set to one, after which method 2200 returns to 2610. Subsequently, any or all of the operations shown as 2610 to 2640 may be repeated one or more times, as appropriate.

Method 2600 may continue to repeat during operation and to implement replacement in the associative memory using probabilistic weights to control the replacement of entries on the majority and minority sides of the PLRU tree. While in example method 2600, the replacement indicator is initialized to a value of 1, such that it initially points to the majority side for the next replacement operation, in another embodiment, the replacement indicator may be initialized to zero, such that the replacement indicator initially points to the minority side for the next replacement operation.

While the cache replacement mechanisms disclosed herein are described in several examples in terms of their applicability to caches, they may applied to TLBs or any other type of storage structure that implements an associative lookup. The addition of weighting to PLRU tree structures has been shown to enhance their performance under scenarios including non-power-of-two set-associativity. In various embodiments, the weight may be realized using counters or using probability to control state transitions in the weighted PLRU trees. The PRNG-based approach is scalable, implementation friendly (e.g., via LFSR), and adaptable in systems in which set associativity is dynamically programmable at runtime (such as those that implement CQE features).

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a core to execute instructions, an associative memory including a plurality of ways organized in an asymmetric tree structure, each way including one or more memory elements, and the number of ways being other than a power of two, and a replacement control unit. The replacement control unit may include circuitry to cause, during execution of instructions and responsive to a miss in the associative memory while a decision node indicator points to a minority side of the asymmetric tree structure, the value of the decision node indicator to direct the next memory element replacement operation to a majority side of the asymmetric tree structure, the majority side of the asymmetric tree structure including more ways that are eligible to service a memory element replacement operation than the minority side of the asymmetric tree structure, and to determine, responsive to a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value. In combination with any of the above embodiments, the circuitry to determine whether or not to cause the value of the decision node indicator to direct the next memory element replacement operation to the minority side of the asymmetric tree structure may include circuitry to compare the current replacement weight value to a threshold replacement weight value, and to cause the value of the decision node indicator to direct the next memory element replacement operation to the minority side of the asymmetric tree structure responsive to a determination that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the threshold replacement weight value may be dependent on a ratio between the number of ways on the majority side of the asymmetric tree structure and the number of ways on the minority side of the asymmetric tree structure that are eligible to service a memory element replacement operation. In combination with any of the above embodiments, the replacement control unit may also include a counter whose value represents the current replacement weight value, and circuitry to increment the counter responsive to a victimization on the minority side of the asymmetric tree structure, and to decrement the counter responsive to a victimization on the majority side of the asymmetric tree structure. In any of the above embodiments, the counter may be one of a plurality of counters, each of which represents a current replacement weight value associated with a respective level in the asymmetric tree structure for which there is an imbalance in the number of ways to which the decision node indicator can direct cache replacement operations on a left side or a right side of a sub-tree in the asymmetric tree structure. In any of the above embodiments, the amount by which the counter is incremented or the amount by which the counter is decremented may be dependent on the number of ways on the majority side of the asymmetric tree structure and on the minority side of the asymmetric tree structure that are eligible to service a memory element replacement operation. In combination with any of the above embodiments, the replacement control unit may also include circuitry to cause, responsive to a hit in the associative memory on the majority side of the asymmetric tree structure, the value of the decision node indicator to direct the next memory element replacement operation to the minority side of the asymmetric tree structure, and to cause, responsive to a hit in the associative memory on the majority side of the asymmetric tree structure, the value of the decision node indicator to direct the next memory element replacement operation to the minority side of the asymmetric tree structure. In combination with any of the above embodiments, the replacement control unit may also include a pseudo random number generator, and the current replacement weight value may represent a probabilistic replacement weight value derived from an output of the pseudo random number generator. The circuitry to determine whether or not to cause the value of the decision node indicator to direct the next memory element replacement operation to the minority side of the asymmetric tree structure may include circuitry to compare the probabilistic replacement weight value to a threshold replacement weight value, and to cause the value of the decision node indicator to direct the next memory element replacement operation to the minority side of the asymmetric tree structure responsive to a determination that the probabilistic replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In combination with any of the above embodiments, the associative memory may include circuitry to implement a number of ways that is a power of two, and the replacement control unit may include circuitry to partition the associative memory to make one or more ways ineligible to perform a memory element replacement operation. The asymmetric tree structure does not include the one or more ways that are ineligible to perform a memory element replacement operation. In any of the above embodiments, the circuitry to partition the associative memory may be dependent on a way mask. In any of the above embodiments, the way mask may be one of a plurality of way masks implemented in the processor, each of which is defined for a respective class of service. In combination with any of the above embodiments, the circuitry to partition the associative memory may include circuitry to repartition the associative memory during operation to change the number of ways on the majority side of the asymmetric tree structure or on the minority side of the asymmetric tree structure that are eligible to service a memory element replacement operation. In combination with any of the above embodiments, the replacement control unit may also include circuitry to update the asymmetric tree structure to reflect results of a repartition operation, and to disable the dependency of the decision node indicator on the current replacement weight value responsive to a repartition operation that results in an updated tree structure in which the number of ways on the majority side of the tree structure and on the minority side of the tree structure that are eligible to service a memory element replacement operation are equal. In any of the above embodiments, the associative memory may include a cache memory or a translation lookaside buffer. In any of the above embodiments, the decision node indicator may be one of a plurality of decision node indicators, each of which is associated with a respective level in the asymmetric tree structure for which there is an imbalance in the number of ways to which the decision node indicator can direct cache replacement operations on a left side or a right side of a sub-tree in the asymmetric tree structure. In combination with any of the above embodiments, the associative memory may include a cache, and the processor may also include a cache controller including circuitry to implement the replacement control unit.

Some embodiments of the present disclosure include a method for memory element replacement. In at least some of these embodiments, the method may include, in a processor, receiving a first request to access data in an associative memory, the associative memory including a plurality of ways organized in an asymmetric tree structure, each way including one or more memory elements, and the number of ways being other than a power of two, and causing, in response to the first request resulting in a miss in the associative memory while a decision node indicator points to a minority side of the asymmetric tree structure, the value of the decision node indicator to direct a next memory element replacement operation to a majority side of the asymmetric tree structure, the majority side of the asymmetric tree structure including more ways that are eligible to service a memory element replacement operation than the minority side of the asymmetric tree structure. The method may also include receiving a second request to access data in the associative memory, and determining, in response to the second request resulting in a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value. In combination with any of the above embodiments, determining whether or not to cause the value of the decision node indicator to direct the next memory element replacement operation to the minority side of the asymmetric tree structure may include comparing the current replacement weight value to a threshold replacement weight value. The method may also include causing the value of the decision node indicator to direct the next memory element replacement operation to the minority side of the asymmetric tree structure in response to determining that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the threshold replacement weight value may be dependent on a ratio between the number of ways on the majority side of the asymmetric tree structure and the number of ways on the minority side of the asymmetric tree structure that are eligible to service a memory element replacement operation. In combination with any of the above embodiments, the method may also include causing, responsive to a hit in the associative memory on the majority side of the asymmetric tree structure, the value of the decision node indicator to direct the next memory element replacement operation to the minority side of the asymmetric tree structure, and causing, responsive to a hit in the associative memory on the majority side of the asymmetric tree structure, the value of the decision node indicator to direct the next memory element replacement operation to the minority side of the asymmetric tree structure. In combination with any of the above embodiments, the method may also include maintaining, in a counter, a value representing the current replacement weight value, the current replacement weight value reflecting relative numbers of victimization operations directed to the majority side of the asymmetric tree structure and to the minority side of the asymmetric tree structure. Determining whether or not to cause the value of the decision node indicator to direct the next memory element replacement operation to the minority side of the asymmetric tree structure may include comparing the value of the counter to a threshold replacement weight value. The method may also include causing the value of the decision node indicator to direct the next memory element replacement operation to the minority side of the asymmetric tree structure in response to determining that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In combination with any of the above embodiments, maintaining a value representing the current replacement weight value may include incrementing the counter in response to a victimization on the minority side of the asymmetric tree structure, and decrementing the counter in response to a victimization on the majority side of the asymmetric tree structure. In any of the above embodiments, the amount by which the counter is incremented or the amount by which the counter is decremented may be dependent on the number of ways on the majority side of the asymmetric tree structure and on the minority side of the asymmetric tree structure that are eligible to service a memory element replacement operation. In combination with any of the above embodiments, determining whether or not to cause the value of the decision node indicator to direct the next memory element replacement operation to the minority side of the asymmetric tree structure may include obtaining a probabilistic replacement weight value from a pseudo random number generator, the probabilistic replacement weight value representing the current replacement weight value, and comparing the probabilistic replacement weight value to a threshold replacement weight value. The method may also include causing the value of the decision node indicator to direct the next memory element replacement operation to the minority side of the asymmetric tree structure in response determining that the probabilistic replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the associative memory may implement a number of ways that is a power of two, and the method may also include partitioning, prior to receiving the first request to access data, the associative memory to make one or more ways ineligible to perform a memory element replacement operation, the partitioning being dependent on a first way mask, and excluding the one or more ways that are ineligible to perform a memory element replacement from the asymmetric tree structure. The method may also include repartitioning, during operation and subsequent to determining whether or not to cause the value of the decision node indicator to direct the next memory element replacement operation to the minority side of the asymmetric tree structure, the associative memory to change the number of ways on the majority side of the asymmetric tree structure or on the minority side of the asymmetric tree structure that are eligible to service a memory element replacement operation, the repartitioning being dependent on a second way mask. In any of the above embodiments, the first way mask and the second way mask may be two of a plurality of masks implemented in the processor, each of which is defined for a respective class of service. In combination with any of the above embodiments, the method may also include updating the asymmetric tree structure to reflect results of the repartitioning, and disabling the dependency of the decision node indicator on the current replacement weight value in response to the repartitioning resulting in an updated tree structure in which the number of ways on the majority side of the tree structure and on the minority side of the tree structure that are eligible to service a memory element replacement operation are equal. In any of the above embodiments, the associative memory may include a cache memory or a translation lookaside buffer.

Some embodiments of the present disclosure include a system. In at least some of these embodiments, the system may include an associative memory including a plurality of ways organized in an asymmetric tree structure, each way including one or more memory elements, and the number of ways being other than a power of two, and a replacement control unit. The replacement control unit may include circuity to cause, responsive to a miss in the associative memory while the decision node indicator points to a minority side of the asymmetric tree structure, the value of the decision node indicator to direct the next memory element replacement operation to a majority side of the asymmetric tree structure, the majority side of the asymmetric tree structure including more ways that are eligible to service a memory element replacement operation than the minority side of the asymmetric tree structure, and to determine, responsive to a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value. In combination with any of the above embodiments, the circuitry to determine whether or not to cause the value of the decision node indicator to direct the next memory element replacement operation to the minority side of the asymmetric tree structure may include circuitry to compare the current replacement weight value to a threshold replacement weight value, and to cause the value of the decision node indicator to direct the next memory element replacement operation to the minority side of the asymmetric tree structure responsive to a determination that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the threshold replacement weight value may be dependent on a ratio between the number of ways on the majority side of the asymmetric tree structure and the number of ways on the minority side of the asymmetric tree structure that are eligible to service a memory element replacement operation. In combination with any of the above embodiments, the replacement control unit may also include a counter whose value represents the current replacement weight value, and circuitry to increment the counter responsive to a victimization on the minority side of the asymmetric tree structure, and to decrement the counter responsive to a victimization on the majority side of the asymmetric tree structure. In any of the above embodiments, the counter may be one of a plurality of counters, each of which represents a current replacement weight value associated with a respective level in the asymmetric tree structure for which there is an imbalance in the number of ways to which the decision node indicator can direct cache replacement operations on a left side or a right side of a sub-tree in the asymmetric tree structure. In any of the above embodiments, the amount by which the counter is incremented or the amount by which the counter is decremented may be dependent on the number of ways on the majority side of the asymmetric tree structure and on the minority side of the asymmetric tree structure that are eligible to service a memory element replacement operation. In combination with any of the above embodiments, the replacement control unit may also include circuitry to cause, responsive to a hit in the associative memory on the majority side of the asymmetric tree structure, the value of the decision node indicator to direct the next memory element replacement operation to the minority side of the asymmetric tree structure, and to cause, responsive to a hit in the associative memory on the majority side of the asymmetric tree structure, the value of the decision node indicator to direct the next memory element replacement operation to the minority side of the asymmetric tree structure. In combination with any of the above embodiments, the replacement control unit may also include a pseudo random number generator, and the current replacement weight value may represent a probabilistic replacement weight value derived from an output of the pseudo random number generator. The circuitry to determine whether or not to cause the value of the decision node indicator to direct the next memory element replacement operation to the minority side of the asymmetric tree structure may include circuitry to compare the probabilistic replacement weight value to a threshold replacement weight value, and to cause the value of the decision node indicator to direct the next memory element replacement operation to the minority side of the asymmetric tree structure responsive to a determination that the probabilistic replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In combination with any of the above embodiments, the associative memory may include circuitry to implement a number of ways that is a power of two, and the replacement control unit may include circuitry to partition the associative memory to make one or more ways ineligible to perform a memory element replacement operation. The asymmetric tree structure may not include the one or more ways that are ineligible to perform a memory element replacement operation. In any of the above embodiments, the circuitry to partition the associative memory may be dependent on a way mask. In any of the above embodiments, the way mask may be one of a plurality of way masks implemented in the system, each of which is defined for a respective class of service. In combination with any of the above embodiments, the circuitry to partition the associative memory may include circuitry to repartition the associative memory during operation to change the number of ways on the majority side of the asymmetric tree structure or on the minority side of the asymmetric tree structure that are eligible to service a memory element replacement operation. In combination with any of the above embodiments, the replacement control unit may also include circuitry to update the asymmetric tree structure to reflect results of a repartition operation, and to disable the dependency of the decision node indicator on the current replacement weight value responsive to a repartition operation that results in an updated tree structure in which the number of ways on the majority side of the tree structure and on the minority side of the tree structure that are eligible to service a memory element replacement operation are equal. In any of the above embodiments, the associative memory may include a cache memory or a translation lookaside buffer. In any of the above embodiments, the decision node indicator may be one of a plurality of decision node indicators, each of which is associated with a respective level in the asymmetric tree structure for which there is an imbalance in the number of ways to which the decision node indicator can direct cache replacement operations on a left side or a right side of a sub-tree in the asymmetric tree structure. In combination with any of the above embodiments, the associative memory may include a cache, and the system may also include a cache controller including circuitry to implement the replacement control unit.

Some embodiments of the present disclosure include a system for executing instructions. In at least some of these embodiments, the system may include means for receiving a first request to access data in an associative memory, the associative memory including a plurality of ways organized in an asymmetric tree structure, each way including one or more memory elements, and the number of ways being other than a power of two, and means for causing, in response to the first request resulting in a miss in the associative memory while a decision node indicator points to a minority side of the asymmetric tree structure, the value of the decision node indicator to direct a next memory element replacement operation to a majority side of the asymmetric tree structure, the majority side of the asymmetric tree structure including more ways that are eligible to service a memory element replacement operation than the minority side of the asymmetric tree structure. The system may also include means for receiving a second request to access data in the associative memory, and means for determining, in response to the second request resulting in a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value. In combination with any of the above embodiments, the means for determining whether or not to cause the value of the decision node indicator to direct the next memory element replacement operation to the minority side of the asymmetric tree structure may include means for comparing the current replacement weight value to a threshold replacement weight value. The system may also include means for causing the value of the decision node indicator to direct the next memory element replacement operation to the minority side of the asymmetric tree structure in response to determining that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the threshold replacement weight value may be dependent on a ratio between the number of ways on the majority side of the asymmetric tree structure and the number of ways on the minority side of the asymmetric tree structure that are eligible to service a memory element replacement operation. In combination with any of the above embodiments, the system may also include means for causing, responsive to a hit in the associative memory on the majority side of the asymmetric tree structure, the value of the decision node indicator to direct the next memory element replacement operation to the minority side of the asymmetric tree structure, and means for causing, responsive to a hit in the associative memory on the majority side of the asymmetric tree structure, the value of the decision node indicator to direct the next memory element replacement operation to the minority side of the asymmetric tree structure. In combination with any of the above embodiments, the system may also include means for maintaining, in a counter, a value representing the current replacement weight value, the current replacement weight value reflecting relative numbers of victimization operations directed to the majority side of the asymmetric tree structure and to the minority side of the asymmetric tree structure. The means for determining whether or not to cause the value of the decision node indicator to direct the next memory element replacement operation to the minority side of the asymmetric tree structure may include means for comparing the value of the counter to a threshold replacement weight value. The system may also include means for causing the value of the decision node indicator to direct the next memory element replacement operation to the minority side of the asymmetric tree structure in response to determining that the current replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In combination with any of the above embodiments, the means for maintaining a value representing the current replacement weight value may include means for incrementing the counter in response to a victimization on the minority side of the asymmetric tree structure, and means for decrementing the counter in response to a victimization on the majority side of the asymmetric tree structure. In any of the above embodiments, the amount by which the counter is incremented or the amount by which the counter is decremented may be dependent on the number of ways on the majority side of the asymmetric tree structure and on the minority side of the asymmetric tree structure that are eligible to service a memory element replacement operation. In combination with any of the above embodiments, the means for determining whether or not to cause the value of the decision node indicator to direct the next memory element replacement operation to the minority side of the asymmetric tree structure may include means for obtaining a probabilistic replacement weight value from a pseudo random number generator, the probabilistic replacement weight value representing the current replacement weight value, and means for comparing the probabilistic replacement weight value to a threshold replacement weight value. The system may also include means for causing the value of the decision node indicator to direct the next memory element replacement operation to the minority side of the asymmetric tree structure in response determining that the probabilistic replacement weight value is below the threshold replacement weight value. The threshold replacement weight value may be dependent on the number of ways on the majority side of the asymmetric tree structure and on the minority side of the asymmetric tree structure that are eligible to service a memory element replacement operation. In any of the above embodiments, the associative memory may implement a number of ways that is a power of two, and the system may also include means for partitioning, prior to receiving the first request to access data, the associative memory to make one or more ways ineligible to perform a memory element replacement operation, the partitioning being dependent on a first way mask, and means for excluding the one or more ways that are ineligible to perform a memory element replacement from the asymmetric tree structure. The system may also include means for repartitioning, during operation and subsequent to determining whether or not to cause the value of the decision node indicator to direct the next memory element replacement operation to the minority side of the asymmetric tree structure, the associative memory to change the number of ways on the majority side of the asymmetric tree structure or on the minority side of the asymmetric tree structure that are eligible to service a memory element replacement operation, the repartitioning being dependent on a second way mask. In any of the above embodiments, the first way mask and the second way mask may be two of a plurality of masks implemented in the processor, each of which is defined for a respective class of service. In combination with any of the above embodiments, the system may also include means for updating the asymmetric tree structure to reflect results of the repartitioning, and means for disabling the dependency of the decision node indicator on the current replacement weight value in response to the repartitioning resulting in an updated tree structure in which the number of ways on the majority side of the tree structure and on the minority side of the tree structure that are eligible to service a memory element replacement operation are equal. In any of the above embodiments, the associative memory may include a cache memory or a translation lookaside buffer.

What is claimed is:

1. A processor, comprising:
an associative memory including a plurality of ways organized in an asymmetric tree structure, each way including one or more memory elements, and the number of ways being other than a power of two;
a replacement control unit, comprising circuitry to:
cause, during execution of instructions and responsive to a miss in the associative memory while a decision node indicator points to a minority side of the asymmetric tree structure, the value of the decision node indicator to direct the next memory element replacement operation to a majority side of the asymmetric tree structure, the majority side of the asymmetric tree structure including more ways that are eligible to service a memory element replacement operation than the minority side of the asymmetric tree structure;
determine, responsive to a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value.

2. The processor of claim 1, wherein:
the circuitry to determine whether or not to cause the value of the decision node indicator to direct the next memory element replacement operation to the minority side of the asymmetric tree structure includes circuitry to:
compare the current replacement weight value to a threshold replacement weight value;
cause the value of the decision node indicator to direct the next memory element replacement operation to the minority side of the asymmetric tree structure responsive to a determination that the current replacement weight value is below the threshold replacement weight value;
the threshold replacement weight value is dependent on the number of ways on the majority side of the asymmetric tree structure and on the minority side of the asymmetric tree structure that are eligible to service a memory element replacement operation.

3. The processor of claim 1, wherein:
the replacement control unit further includes:
a counter whose value represents the current replacement weight value; and
circuitry to:
increment the counter responsive to a victimization on the minority side of the asymmetric tree structure;
decrement the counter responsive to a victimization on the majority side of the asymmetric tree structure.

4. The processor of claim 1, wherein:
the replacement control unit further includes circuitry to:
cause, responsive to a hit in the associative memory on the majority side of the asymmetric tree structure, the value of the decision node indicator to direct the next memory element replacement operation to the minority side of the asymmetric tree structure;
cause, responsive to a hit in the associative memory on the majority side of the asymmetric tree structure, the value of the decision node indicator to direct the next memory element replacement operation to the minority side of the asymmetric tree structure.

5. The processor of claim 1, wherein:
the replacement control unit further includes a pseudo random number generator;
the current replacement weight value represents a probabilistic replacement weight value derived from an output of the pseudo random number generator;
the circuitry to determine whether or not to cause the value of the decision node indicator to direct the next memory element replacement operation to the minority side of the asymmetric tree structure includes circuitry to:
compare the probabilistic replacement weight value to a threshold replacement weight value;
cause the value of the decision node indicator to direct the next memory element replacement operation to the minority side of the asymmetric tree structure responsive to a determination that the probabilistic replacement weight value is below the threshold replacement weight value;
the threshold replacement weight value is dependent on the number of ways on the majority side of the asymmetric tree structure and on the minority side of the asymmetric tree structure that are eligible to service a memory element replacement operation.

6. The processor of claim 1, wherein:
the associative memory includes circuitry to implement a number of ways that is a power of two;
the replacement control unit includes circuitry to partition the associative memory to make one or more ways ineligible to perform a memory element replacement operation; and
the asymmetric tree structure does not include the one or more ways that are ineligible to perform a memory element replacement operation.

7. The processor of claim 6, wherein:
the circuitry to partition the associative memory is dependent on a way mask defined for a given class of service.

8. The processor of claim 6, wherein:
the circuitry to partition the associative memory includes circuitry to repartition the associative memory during operation to change the number of ways on the majority side of the asymmetric tree structure or on the minority side of the asymmetric tree structure that are eligible to service a memory element replacement operation.

9. The processor of claim 1, wherein the associative memory comprises a cache memory or a translation lookaside buffer.

10. A system, comprising:
an associative memory including a plurality of ways organized in an asymmetric tree structure, each way including one or more memory elements, and the number of ways being other than a power of two;
a replacement control unit, comprising circuity to:
cause, responsive to a miss in the associative memory while the decision node indicator points to a minority side of the asymmetric tree structure, the value of the decision node indicator to direct the next memory element replacement operation to a majority side of the asymmetric tree structure, the majority side of the asymmetric tree structure including more ways that are eligible to service a memory element replacement operation than the minority side of the asymmetric tree structure;
determine, responsive to a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value.

11. The system of claim 10, wherein:
the circuitry to determine whether or not to cause the value of the decision node indicator to direct the next memory element replacement operation to the minority side of the asymmetric tree structure includes circuitry to:
compare the current replacement weight value to a threshold replacement weight value;
cause the value of the decision node indicator to direct the next memory element replacement operation to the minority side of the asymmetric tree structure responsive to a determination that the current replacement weight value is below the threshold replacement weight value;
the threshold replacement weight value is dependent on the number of ways on the majority side of the asymmetric tree structure and on the minority side of the asymmetric tree structure that are eligible to service a memory element replacement operation.

12. The system of claim 10, wherein:
the replacement control unit further includes:
a counter whose value represents the current replacement weight value; and
circuitry to:
increment the counter responsive to a victimization on the minority side of the asymmetric tree structure;
decrement the counter responsive to a victimization on the majority side of the asymmetric tree structure.

13. The system of claim 10, wherein:
the replacement control unit further includes circuitry to:
cause, responsive to a hit in the associative memory on the majority side of the asymmetric tree structure, the value of the decision node indicator to direct the next memory element replacement operation to the minority side of the asymmetric tree structure;
cause, responsive to a hit in the associative memory on the majority side of the asymmetric tree structure, the value of the decision node indicator to direct the next memory element replacement operation to the minority side of the asymmetric tree structure.

14. The system of claim 10, wherein:
the replacement control unit further includes a pseudo random number generator;
the current replacement weight value represents a probabilistic replacement weight value derived from an output of the pseudo random number generator;
the circuitry to determine whether or not to cause the value of the decision node indicator to direct the next memory element replacement operation to the minority side of the asymmetric tree structure includes circuitry to:
compare the probabilistic replacement weight value to a threshold replacement weight value;
cause the value of the decision node indicator to direct the next memory element replacement operation to the minority side of the asymmetric tree structure responsive to a determination that the probabilistic replacement weight value is below the threshold replacement weight value;
the threshold replacement weight value is dependent on the number of ways on the majority side of the asymmetric tree structure and on the minority side of the asymmetric tree structure that are eligible to service a memory element replacement operation.

15. The system of claim 10, wherein:
the associative memory includes circuitry to implement a number of ways that is a power of two;

the replacement control unit includes circuitry to partition the associative memory to make one or more ways ineligible to perform a memory element replacement operation; and the asymmetric tree structure does not include the one or more ways that are ineligible to perform a memory element replacement operation.

16. The system of claim 15, wherein:

the circuitry to partition the associative memory includes circuitry to repartition the associative memory during operation to change the number of ways on the majority side of the asymmetric tree structure or on the minority side of the asymmetric tree structure that are eligible to service a memory element replacement operation.

17. A method, comprising, in a processor:

receiving a first request to access data in an associative memory, the associative memory including a plurality of ways organized in an asymmetric tree structure, each way including one or more memory elements, and the number of ways being other than a power of two;

causing, in response to the first request resulting in a miss in the associative memory while a decision node indicator points to a minority side of the asymmetric tree structure, the value of the decision node indicator to direct a next memory element replacement operation to a majority side of the asymmetric tree structure, the majority side of the asymmetric tree structure including more ways that are eligible to service a memory element replacement operation than the minority side of the asymmetric tree structure;

receiving a second request to access data in the associative memory;

determining, in response to the second request resulting in a miss in the associative memory while the decision node indicator points to the majority side of the asymmetric tree structure, whether or not to cause the value of the decision node indicator to direct the next memory element replacement operation to the minority side of the asymmetric tree structure dependent on a current replacement weight value.

18. The method of claim 17, wherein:

the method further comprises:

maintaining, in a counter, a value representing the current replacement weight value, the current replacement weight value reflecting relative numbers of victimization operations directed to the majority side of the asymmetric tree structure and to the minority side of the asymmetric tree structure;

determining whether or not to cause the value of the decision node indicator to direct the next memory element replacement operation to the minority side of the asymmetric tree structure comprises:

comparing the value of the counter to a threshold replacement weight value;

the method further comprises:

causing the value of the decision node indicator to direct the next memory element replacement operation to the minority side of the asymmetric tree structure in response to determining that the current replacement weight value is below the threshold replacement weight value;

the threshold replacement weight value is dependent on the number of ways on the majority side of the asymmetric tree structure and on the minority side of the asymmetric tree structure that are eligible to service a memory element replacement operation.

19. The method of claim 17, wherein:

determining whether or not to cause the value of the decision node indicator to direct the next memory element replacement operation to the minority side of the asymmetric tree structure comprises:

obtaining a probabilistic replacement weight value from a pseudo random number generator, the probabilistic replacement weight value representing the current replacement weight value;

comparing the probabilistic replacement weight value to a threshold replacement weight value;

the method further comprises:

causing the value of the decision node indicator to direct the next memory element replacement operation to the minority side of the asymmetric tree structure in response determining that the probabilistic replacement weight value is below the threshold replacement weight value;

the threshold replacement weight value is dependent on the number of ways on the majority side of the asymmetric tree structure and on the minority side of the asymmetric tree structure that are eligible to service a memory element replacement operation.

20. The method of claim 17, wherein:

the associative memory implements a number of ways that is a power of two;

the method further comprises:

partitioning, prior to receiving the first request to access data, the associative memory to make one or more ways ineligible to perform a memory element replacement operation, the partitioning being dependent on a first way mask;

excluding the one or more ways that are ineligible to perform a memory element replacement operation from the asymmetric tree structure;

repartitioning, during operation and subsequent to determining whether or not to cause the value of the decision node indicator to direct the next memory element replacement operation to the minority side of the asymmetric tree structure, the associative memory to change the number of ways on the majority side of the asymmetric tree structure or on the minority side of the asymmetric tree structure that are eligible to service a memory element replacement operation, the repartitioning being dependent on a second way mask.

* * * * *